(12) United States Patent
Shimoshikiryo et al.

(10) Patent No.: US 6,663,795 B2
(45) Date of Patent: Dec. 16, 2003

(54) LIQUID CRYSTAL DISPLAY DEVICE AND LIQUID CRYSTAL MATERIAL

(75) Inventors: Fumikazu Shimoshikiryo, Tenri (JP); Shuichi Kozaki, Nara (JP); Koichi Miyachi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/277,936

(22) Filed: Oct. 23, 2002

(65) Prior Publication Data

US 2003/0107701 A1 Jun. 12, 2003

Related U.S. Application Data

(62) Division of application No. 09/564,537, filed on May 4, 2000, now Pat. No. 6,493,055, which is a division of application No. 08/942,682, filed on Oct. 2, 1997, now Pat. No. 6,130,739.

(30) Foreign Application Priority Data

Oct. 4, 1996 (JP) .............................................. 8-264926
Sep. 4, 1997 (JP) .............................................. 9-240085

(51) Int. Cl.[7] .............................................. C09K 19/52
(52) U.S. Cl. .............................................. 252/299.01
(58) Field of Search ....................... 252/299.01, 299.67; 349/182

(56) References Cited

U.S. PATENT DOCUMENTS

| 3,687,515 A | 8/1972 | Haas et al. |
| 3,914,020 A | 10/1975 | Helfrich |
| 3,914,022 A | 10/1975 | Kashnow |
| 3,991,241 A | 11/1976 | Matsumoto et al. |
| 4,281,903 A | 8/1981 | Gharadjedaghi |
| 4,345,249 A | 8/1982 | Togashi ..................... 345/103 |
| 4,664,479 A | 5/1987 | Hiroshi |
| 4,917,475 A | 4/1990 | Meyer et al. |
| 5,387,370 A | 2/1995 | Tomizawa et al. |
| 5,905,557 A | 5/1999 | Yaniv |
| 6,130,739 A | * 10/2000 | Shimoshikiryo et al. .... 349/182 |
| 6,195,145 B1 | * 2/2001 | Shimoshikiryo et al. .... 349/123 |
| 6,493,055 B1 | * 12/2002 | Shimoshikiryo et al. .... 349/141 |

FOREIGN PATENT DOCUMENTS

| EP | 779353 | * | 6/1997 |
| JP | 53-48542 A | | 5/1978 |
| JP | 53-89753 A | | 8/1978 |
| JP | 56-91277 | | 8/1982 |
| JP | 63-309931 | | 9/1988 |
| JP | 6-160878 | | 6/1994 |

OTHER PUBLICATIONS

CAPLUS 1996: 437492.*
Matsumoto et al "LP–A: Display Characteristics of In–Plae–Switching (IPS) LCDs and a Wide–Viewing–Angle 14.5–in. IPS TFT–LCD" SID EuroDisplay, 1996.
Haas et al Physical Review Letters, vol. 25, No. 19, pp 1326–1327, 1970.
Matsunaga et al, Liquid Crystals 1994, Taylor & Francis Ltd., vol. 17, pp. 659–666.

* cited by examiner

*Primary Examiner*—Shean C. Wu
(74) *Attorney, Agent, or Firm*—Nixon & Vanderhye P.C.

(57) ABSTRACT

A liquid crystal display device of the present invention includes: a pair of substrates for which a homeotropic alignment treatment is performed; a liquid crystal layer provided between the substrates; and a transverse electric field generating electrode capable of being driven in a matrix driving manner which is provided on at least one of the pair of substrates and is connected to external control means. A liquid crystal material contained in the liquid crystal layer is a liquid crystal material which, as a whole liquid crystal layer, generates spontaneous polarization by a piezoelectric effect.

4 Claims, 12 Drawing Sheets

FIG. 1A  FIG. 1B
FIG. 1C  FIG. 1D
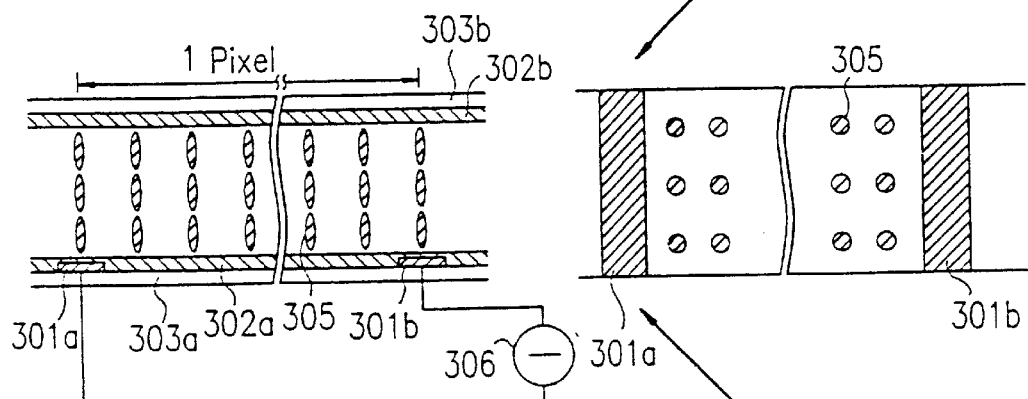
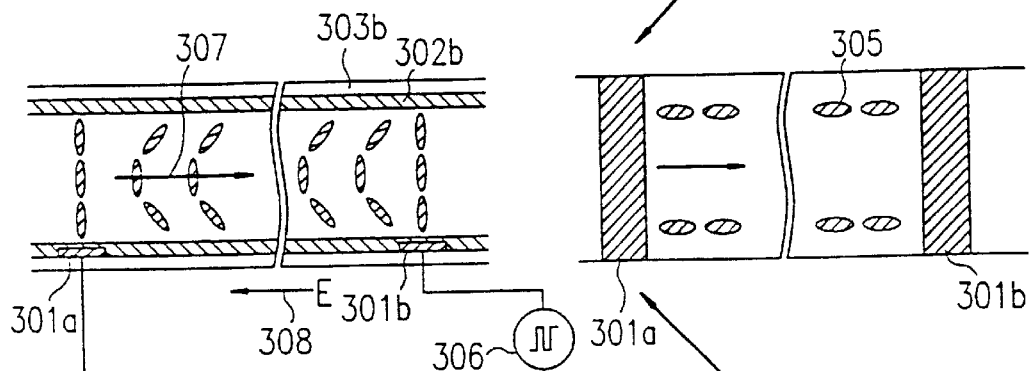

LIQUID CRYSTAL DISPLAY DEVICE AND LIQUID CRYSTAL MATERIAL

This application is a divisional of application Ser. No. 09/564,537, filed May 4, 2000, now U.S. Pat. No. 6,493,055, issued Dec. 10, 2002, which in turn is a divisional of application Ser. No. 08/942,682, filed Oct. 2, 1997, now U.S. Pat. No. 6,130,739, issued Oct. 10, 2000, the entire content of which is hereby incorporated by reference in this application.

BACKGROUND OF THE INVENTION

1. Field of the Invention

The present invention relates to a matrix driving type transverse electric field type liquid crystal display device of a novel display mode. More particularly, the present invention relates to a matrix driving type transverse electric field type liquid crystal display device of a novel display mode using a homeotropically-oriented nematic liquid crystal material which, as a whole liquid crystal layer, generates spontaneous polarization in the presence of an applied transverse electric field; and to a liquid crystal material which may provide such a liquid crystal display device.

2. Description of the Related Art

A transverse electric field type liquid crystal display device has been conventionally known. The transverse electric field type liquid crystal display device has a liquid crystal layer between a pair of substrates, the liquid crystal layer containing a nematic liquid crystal material oriented parallel to the substrate surface, whereby the device is driven by an applied transverse electric field and by utilizing dielectric anisotropy of the nematic liquid crystal material (e.g., Japanese Laid-Open Patent Publication No. 6-160878).

The transverse electric field type liquid crystal display device has problems in that the aperture ratio is low; a high contrast display is not easily achieved; and the response speed is low. Referring to FIGS. 12A to 12D, the configuration of a conventional transverse electric field type liquid crystal display device and the problems associated therewith will be described.

The liquid crystal display device includes a liquid crystal panel. The liquid crystal panel includes a pair of substrates 203 and 203, transverse electric field electrodes 201 and 202 both of which are provided on one of the substrates, alignment films 204 and 204 each provided on one of the substrates on the liquid crystal layer side thereof, and a liquid crystal layer 210 as a display medium. The liquid crystal display device further includes polarizers 206 and 206 provided external to the liquid crystal panel. In the conventional transverse electric field type liquid crystal display device, in the absence of an applied voltage, liquid crystal molecules 205 contained in the liquid crystal layer 210 are not twisted between the pair of substrates 203 and 203 but are oriented generally parallel to the substrate 203, as shown in FIGS. 12A and 12C. Each of the substrates is provided with the polarizer 206 in such a manner that the direction of a polarization axis 209 of one polarizer 206 is identical to the direction of a molecular axis 208 of the liquid crystal molecules 205 while the direction of a polarization axis 209 of the other polarizer 206 is orthogonal to the direction of the molecular axis 208 of the liquid crystal molecules 205. For example, in the liquid crystal display device of the above-identified publication, the optical axis of linearly-polarized light which has passed through a polarizer provided on a lower substrate (hereinafter, referred to as the "lower polarizer"), i.e., the transmission axis of the lower polarizer, is identical to the molecular axis of the liquid crystal molecules. Therefore, there is no birefringence generated by the liquid crystal layer. As a result, the linearly-polarized light coming from the lower side of the liquid crystal panel reaches another polarizer provided on an upper substrate (hereinafter, referred to as the "upper polarizer") without becoming elliptically-polarized light or changing the direction of its optical axis, whereby the linearly-polarized light is blocked by the upper polarizer.

On the other hand, as shown in FIGS. 12B and 12D, when an electric field E is applied in a direction 207 which is at a certain angle with respect to the molecular axis direction 208 of the liquid crystal molecules 205 and is generally parallel to the substrate surface, due to the dielectric anisotropy of the liquid crystal molecules 205, the liquid crystal molecules 205 rotate in a plane parallel to the substrate surface so that the minor axis thereof is orthogonal to the line of electric force. As a result, the optical axis of the linearly-polarized light which has passed through the lower polarizer is shifted with respect to that of the liquid crystal molecules, whereby the light coming from the lower side of the liquid crystal panel passes through the upper polarizer.

The aperture ratio of the conventional transverse electric field type liquid crystal display device is low because the liquid crystal molecules are driven based upon the dielectric anisotropy. In order to maximize the transmission in the conventional liquid crystal display device, the liquid crystal molecules therein must be rotated by 45°. The field strength required for rotating the liquid crystal molecules may vary depending upon the dielectric anisotropy and the elastic constant of the liquid crystal molecules, and the like, but is about 1 V/$\mu$m for a commonly-employed liquid crystal material. When a liquid crystal display device having an ordinary pixel size is produced using an ordinary liquid crystal material, the short side of a pixel is about 80 $\mu$m long. Accordingly, a driving voltage of about 80 V is required to be applied between the transverse electric field electrodes 201 and 202. However, such a driving voltage, as high as about 80 V, is not practical for an ordinary matrix driving type liquid crystal display device. Therefore, in the conventional liquid crystal display device, an additional electrode (not shown) needs to be provided between the electrodes 201 and 202 in FIGS. 12A to 12D in order to reduce the interval between two electrodes and thus the driving voltage required therebetween. As a result, the additional electrode creates an additional light-blocking portion, thereby lowering the aperture ratio of the liquid crystal display device.

A high contrast display is not easily achieved in the conventional transverse electric field type liquid crystal display device due to the configuration thereof. As described above, in order to block light in the absence of an applied voltage, the direction of the polarization axis of one polarizer (e.g., the transmission axis of the lower polarizer) needs to be identical to the molecular axis direction of the liquid crystal molecules while the direction of the polarization axis of the other polarizer (e.g., the transmission axis of the upper polarizer) needs to be orthogonal to the molecular axis direction of the liquid crystal molecules. For example, if the polarization axis of the lower polarizer is not identical to the molecular axis of the liquid crystal molecules, linearly-polarized light which has passed through the lower polarizer becomes elliptically-polarized light due to the birefringence of the liquid crystal layer, and thus passes through the upper polarizer. Therefore, in order to achieve a high contrast display, it is necessary for the direction of the alignment treatment (e.g., rubbing treatment) for the upper substrate to be precisely identical to that for the lower substrate, for the direction of the alignment treatment to be precisely identical to the polarization axis direction of one of the polarizers, and for the direction of the alignment treatment to be precisely orthogonal to the polarization axis direction of the other polarizer. However, when actually producing a liquid crystal display device, it is very difficult to precisely arrange these components as described above. Accordingly, it is very difficult to achieve a high contrast display with the conventional transverse electric field type liquid crystal display device. Moreover, the productivity in the manufacture of such a liquid crystal display device is very low due to the precise arrangement of the components being required.

The response speed is low in the conventional liquid crystal display device for the following reason. The response speed can be generally classified into two factors, i.e., one factor associated with an increase in the applied voltage and one factor associated with a decrease in the applied voltage. The factor which is of particular importance in the conventional liquid crystal display device is the one associated with a decrease in the applied voltage. In the conventional liquid crystal display device, the liquid crystal molecules are driven based upon the dielectric anisotropy of the liquid crystal molecules. In particular, when a voltage is applied and the field strength thus increases, the liquid crystal molecules are driven with a driving force provided by the electric field acting upon the liquid crystal molecules which have dielectric anisotropy. However, when application of voltage is stopped and the field strength thus decreases, the movement of the liquid crystal molecules is caused only by the restoring force of the elastic liquid crystal molecules (since no driving force is provided by the electric field). As a result, the response speed when the field strength decreases is considerably lower than that when the field strength increases, whereby the total response speed of the liquid crystal display device is relatively low.

On the other hand, another type of transverse electric field type liquid crystal display device has been known having a liquid crystal layer which includes a homeotropically-oriented n-type nematic liquid crystal material (U.S. Pat. No. 3,687,515). However, this patent neither discloses nor suggests how to drive the n-type nematic liquid crystal material. Thus, the technology described therein does not solve any of the above-described problems. Moreover, this technology is limited to a segment type display, and is not capable of performing a high definition display of an arbitrary still image or motion picture. The reasons therefor will be described below. In this technology, in order to provide within a single panel a plurality of regions (pixels) whose transmissions can be individually varied, it is necessary to provide a plurality of electrodes which can be driven individually and to provide the same number of lead wires for introducing a voltage to the electrodes from a source outside of the panel. In such a configuration, in order to improve the definition of a displayed image, a great number of electrodes which can be driven individually must be provided. The number of the lead wires is accordingly increased by the number of additionally-provided electrodes. As a result, the arrangement of the lead wires within the panel, joining terminals connecting to a driving circuit external to the panel, and the like, becomes very complicated, whereby it is impossible to produce a practical liquid crystal display device.

As described above, there is a need for a transverse electric field type liquid crystal display device with the pixel size and driving voltage being in a practical range, and having a high aperture ratio, a high contrast (i.e., a high transmission), a high response speed, and capability of displaying a high definition image.

SUMMARY OF THE INVENTION

According to one aspect of this invention, a liquid crystal display device includes: a pair of substrates for which a homeotropic alignment treatment is performed; a liquid crystal layer provided between the substrates; and a transverse electric field generating electrode capable of being driven in a matrix driving manner which is provided on at least one of the pair of substrates and is connected to external control means. The liquid crystal material contained in the liquid crystal layer is a liquid crystal material which generates spontaneous polarization in the layer as a whole by a piezoelectric effect.

In one embodiment of the invention, the liquid crystal material is an n-type nematic liquid crystal material.

In another embodiment of the invention, the liquid crystal material is a liquid crystal material whose permanent dipole moment in a direction of a minor axis of the molecule is not zero.

In still another embodiment of the invention, the liquid crystal material has a molecular shape selected from a banana shape, a cone shape and a wedge shape.

In still another embodiment of the invention, the means for driving the transverse electric field generating electrode is active matrix driving means using an active element.

In still another embodiment of the invention, the transverse electric field generating electrode substantially extends from one of the pair of substrates to the other substrate.

In still another embodiment of the invention, the liquid crystal material has a banana-like or conical molecular shape including at least two rodlike portions derived from a rodlike compound, at least one of which exhibits liquid crystallinity, and a linking portion derived from a compound selected from an alcohol compound, a ring compound and a nonlinear compound.

According to another aspect of this invention, a liquid crystal display device includes: a pair of substrates for which a homeotropic alignment treatment is performed; a liquid crystal layer provided between the substrates; and a transverse electric field generating electrode capable of being driven in a matrix driving manner which is provided on at least one of the pair of substrates and is connected to external control means. A liquid crystal material contained in the liquid crystal layer is a liquid crystal material which has different refractive index components $n_x$, $n_y$, $n_z$ for each of X, Y and Z directions in a XYZ system of coordinates.

In one embodiment of the invention, the liquid crystal material is an n-type nematic liquid crystal material.

In another embodiment of the invention, the liquid crystal material is a liquid crystal material which has different refractive index components $n_x$, $n_y$, $n_z$ for each of X, Y and Z directions in a XYZ system of coordinates and has different dielectric constants $\epsilon_x$, $\epsilon_y$, $\epsilon_z$ for each of the X, Y and Z directions.

In still another embodiment of the invention, the liquid crystal material is one of compounds shown below:

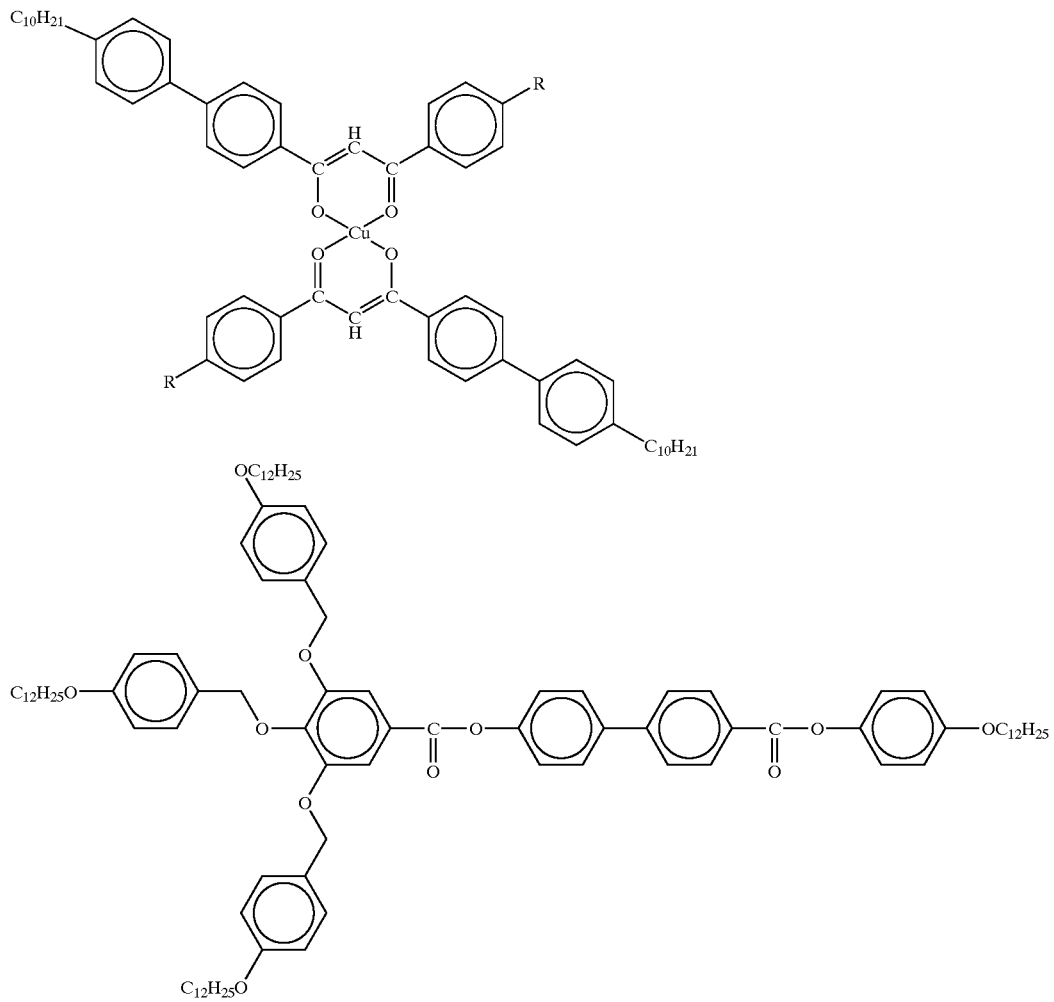

In still another embodiment of the invention, the means for driving the transverse electric field generating electrode is active matrix driving means using an active element.

In still another embodiment of the invention, the transverse electric field generating electrode substantially extends from one of the pair of substrates to the other substrate.

According to still another aspect of this invention, a liquid crystal display device includes: a pair of substrates for which a homeotropic alignment treatment is performed; a liquid crystal layer provided between the substrates; and a transverse electric field generating electrode capable of being driven in a matrix driving manner which is provided on at least one of the pair of substrates and is connected to external control means. A liquid crystal material contained in the liquid crystal layer is a liquid crystal material whose permanent dipole moment component in a plane parallel to the substrate is not zero, and which has different refractive index components $n_x$, $n_y$, $n_z$ for each of X, Y and Z directions in a XYZ system of coordinates.

In one embodiment of the invention, the means for driving the transverse electric field generating electrode is active matrix driving means using an active element.

In another embodiment of the invention, the transverse electric field generating electrode substantially extends from one of the pair of substrates to the other substrate.

According to still another aspect of this invention, a liquid crystal material has a banana-like or conical molecular shape including at least two rodlike portions derived from a rodlike compound, at least one of which exhibits liquid crystallinity, and a linking portion derived from a compound selected from an alcohol compound, a ring compound and a nonlinear compound.

In one embodiment of the invention, the linking portion is derived from a compound having a dipole moment.

Thus, the invention described herein makes possible the advantages of: (1) providing a transverse electric field type liquid crystal display device having a high aperture ratio; (2) providing a transverse electric field type liquid crystal display device having a high contrast (i.e., a high transmission); (3) providing a transverse electric field type liquid crystal display device having a high response speed; (4) providing a transverse electric field type liquid crystal display device capable of displaying a high definition image; and (5) providing a liquid crystal material capable of providing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIGS. 1A to 1D are schematic diagrams illustrating the driving principle of liquid crystal molecules according to a preferred embodiment of the present invention.

DESCRIPTION OF THE PREFERRED EMBODIMENTS

Figure 2A:
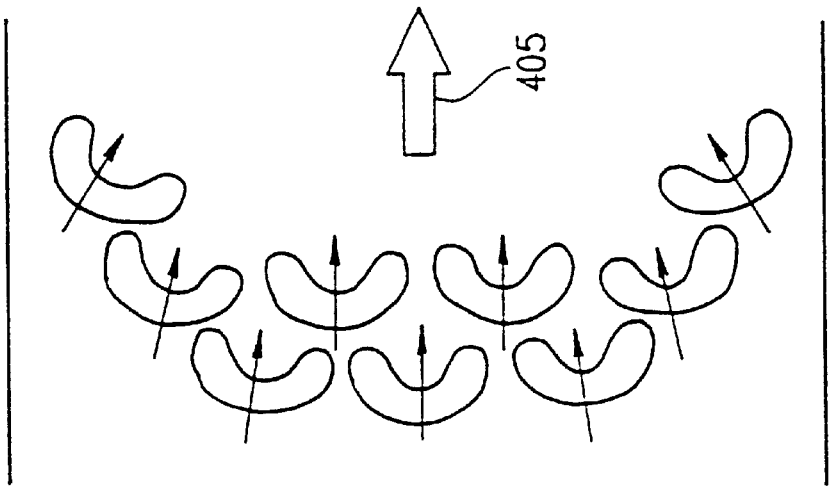
FIGS. 2A to 2C are schematic diagrams illustrating spontaneous polarization of banana-shaped liquid crystal molecules and the orientation thereof in a liquid crystal display device of the present invention.

In the present specification, the term "a rodlike compound" is meant to include a compound having a rigid rodlike molecular structure.

The term "a ring compound" is meant to include a compound having a ring structure (e.g., substituted or non-substituted aromatic ring, substituted or non-substituted alicyclic ring, or heterocyclic ring).

The term "a nonlinear compound" is meant to include a compound having a nonlinear molecular shape.

The term "an alcohol compound" is meant to include a monohydric alcohol and a polyhydric alcohol.

A. First Driving Principle of Liquid Crystal Molecules According to the Present Invention:

A-1. Liquid crystal material which, as a whole liquid crystal layer, generates spontaneous polarization by the piezoelectric effect:

A liquid crystal material used in a preferred embodiment of the present invention is a liquid crystal material which can, as a whole liquid crystal layer, generate spontaneous polarization by the piezoelectric effect (preferably, a nematic liquid crystal material and, more preferably, an n-type nematic liquid crystal material). The "piezoelectric effect" as used herein means a phenomenon of an electrical displacement caused when liquid crystal molecules having a permanent dipole are forcibly oriented in a certain direction, or a change in the orientation of a liquid crystal layer caused when an electric field is applied. For example, such a liquid crystal material may be a liquid crystal material whose permanent dipole moment component in the direction of the minor axis of the liquid crystal molecules is not zero. For example, such a liquid crystal material may include a liquid crystal material having a banana-like molecular shape (hereinafter, referred to as the "banana-shaped liquid crystal material"), a liquid crystal material having a conical molecular shape (hereinafter, referred to as the "cone-shaped liquid crystal material"), a liquid crystal material having a wedge-like molecular shape (hereinafter, referred to as the "wedge-shaped liquid crystal material"). Using such a liquid crystal material, it is possible to realize a transverse electric field type liquid crystal display device having a high aperture ratio and a high response speed.

Such a liquid crystal material can be synthesized by condensing together at least two rodlike compounds (compounds each having a generally rodlike molecular shape). At least one of the rodlike compounds is a compound which exhibits liquid crystallinity (e.g., the compounds shown in Table 1).

TABLE 1

Rodlike compounds $$Z-\bigcirc-O-\underset{\parallel}{C}-\bigcirc-C_mH_{2m+1}$$

$$Z-\bigcirc-N=\underset{H}{C}-\bigcirc-OC_mH_{2m+1}$$

$$Z-\bigcirc-\underset{H}{C}=N-\bigcirc-CN$$

$$Z-\bigcirc-\bigcirc-OC_mH_{2m+1}$$

In the table, m is an integer of one or greater; and Z may be any suitable substituent (e.g., H, OH, COOH) as long as the advantages of the present invention are not compromised.

For example, the liquid crystal material represented by Formula 3 may be obtained by condensing a Schiff-type compound (Formula 1) having a carboxyl group which is a rodlike compound exhibiting liquid crystallinity with an alcohol compound (Formula 2). In Formula 2, n is an odd number, and preferably is 1 and 3 (in the illustrated case, n is 3). Such a liquid crystal material has a banana-like or conical molecular shape (note that Formula 3 represents a liquid crystal material having a banana-like molecular shape) including at least two rodlike portions derived from a rodlike compound and a linking portion derived from an alcohol compound. The condensation may be performed under any suitable condition as long as the advantages of the present invention are not compromised (for example, the liquid crystal material represented by Formula 3 may be obtained by reacting the compound represented by Formula 1 with the compound represented by Formula 2 (where n is 3)).

Formula 1. The rodlike compound may be directly bound to the ring or nonlinear compond, or may be bound thereto via flexible linear moiety (e.g., $-(CH_2)_p-$, $-(CH_2)_p-O-(CH_2)_q-$ where p is an integer of one or greater and q is an integer of zero or greater).

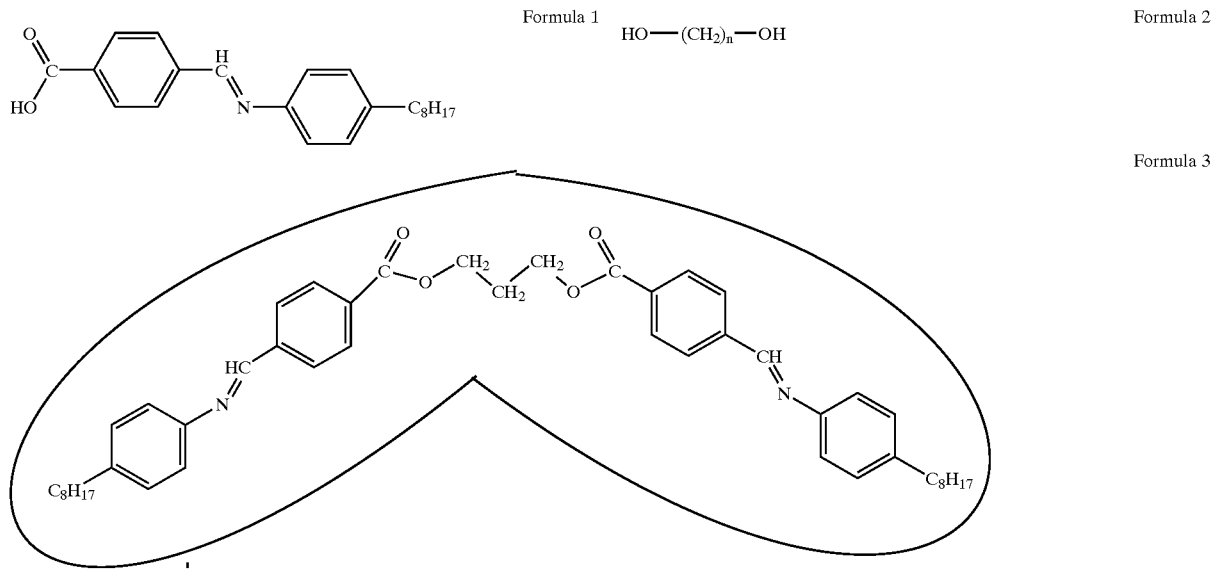

Formula 1

Formula 2

Formula 3

Alternatively, the above-described liquid crystal material may be synthesized by reacting at least two rodlike compounds with a ring compound or a nonlinear compound. Specific examples of the ring compound may include those listed in Tables 2 to 4. Specific examples of the nonlinear compound may include those listed in Table 5. For example, two rodlike compounds may be bound to one of the ring compounds listed in Tables 2 to 4 by reacting with the substituent $R_1$ and $R_2$, respectively. Alternatively, two rodlike compounds may be bound to one of the nonlinear compounds listed in Tables 5 by reacting with the substituent $R_3$ and $R_4$, respectively. Thus, these rodlike compounds may be bound to the listed compound at the positions such that their molecular long axes form a certain angle with respect to each other. The substituent $R_1$ and $R_2$ of the ring compound may include H, OH, COOH. The substituent $R_3$ and $R_4$ of the nonlinear compound may include H, a substituted or non-substituted alkyl group. The substituent Z of the rodlike compond may include H, OH, COOH. As in the above-described case, at least one of the rodlike compounds is a compound which exhibits liquid crystallinity (e.g., one of the compounds listed in Table 1). Such a liquid crystal material has a banana-like or conical molecular shape including at least two rodlike portions derived from a rodlike compound and a linking portion derived from a ring compound or a nonlinear compound. For example, the banana-shaped liquid crystal material represented by Formula 6 may be obtained by condensing a Schiff-type compound (Formula 1) having a carboxyl group which is a rodlike compound exhibiting liquid crystallinity with an alcohol-type ring compound (Formula 5). Alternatively, the banana-shaped liquid crystal material represented by Formula 8 may be obtained by substituting ethylene with a rodlike compound having a structure similar to that represented by

TABLE 2

Ring compounds

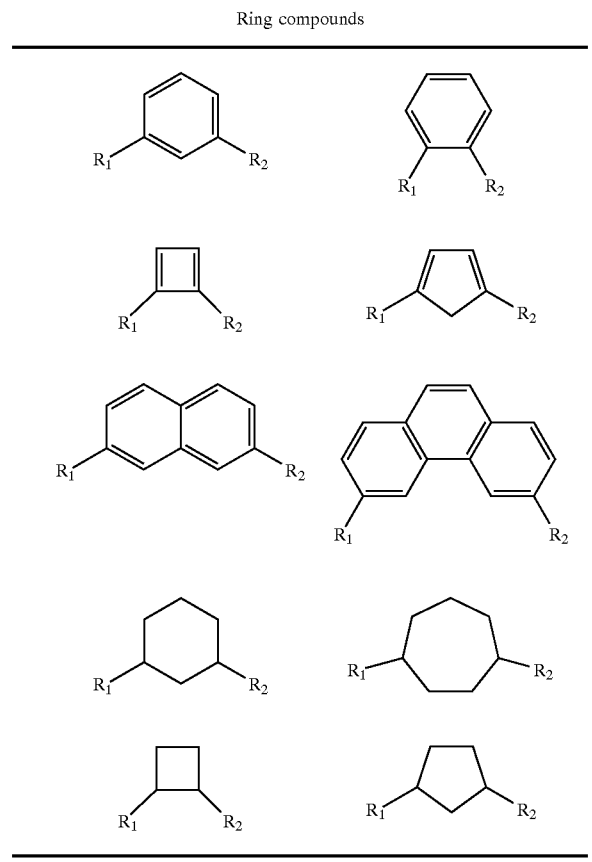

TABLE 3
Ring compounds
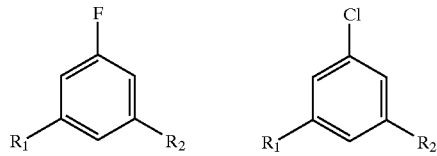
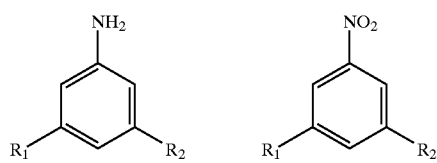
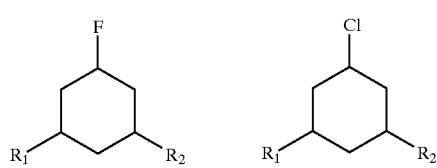
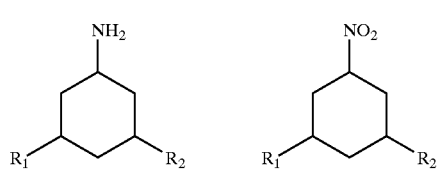
TABLE 4
Ring compounds
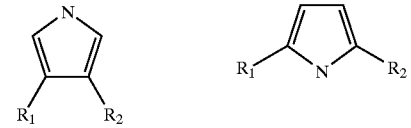
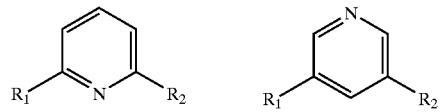
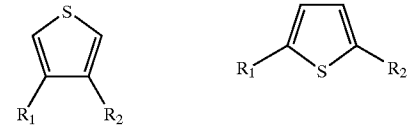
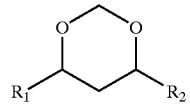
TABLE 5
Nonlinear compounds
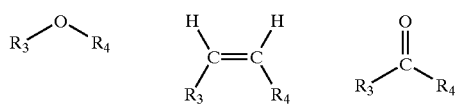
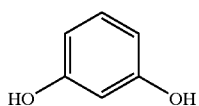
Formula 5
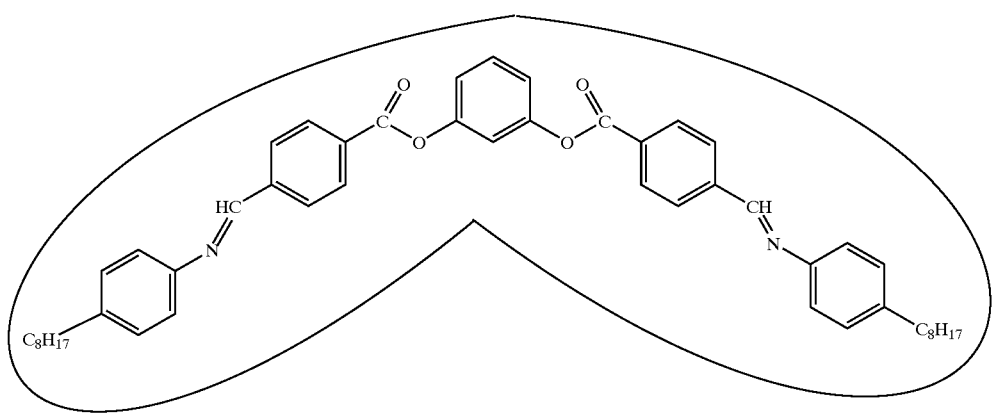
Formula 6

Formula 8

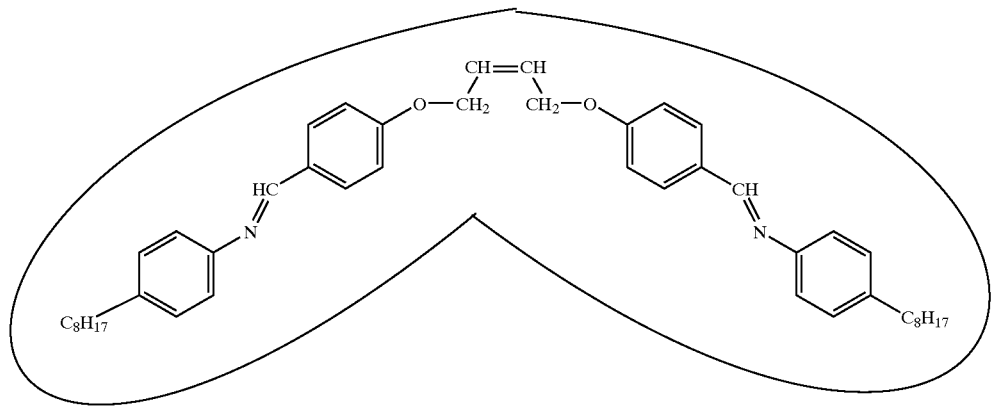

Using an appropriate ring or nonlinear compound, the cone-shaped or wedge-shaped liquid crystal material may be obtained in the same manner as the banana-shaped liquid crystal material. Examples of such ring or nonlinear compound may include the following compounds.

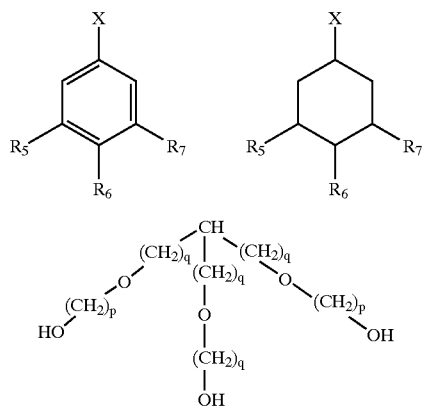

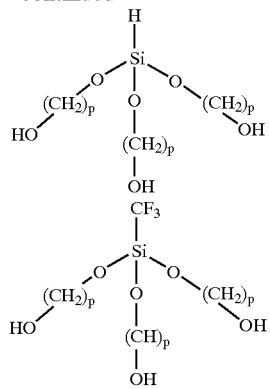

The substituent X may include H, F, Cl, $NH_2$, and $NO_2$. The substituent $R_5$, $R_6$ and $R_7$ may include H, OH, COOH. p is an integer of one or greater. q is an integer of zero or greater. For example, the cone-shaped liquid crystal material represented by Formula 10, 11 or 12 may be obtained by reacting three rodlike compounds represented by Formula 1 with any one of the above-mentioned compounds. Any suitable reaction condition may be employed for producing the cone-shaped or wedge-shaped liquid crystal material.

Formula 10
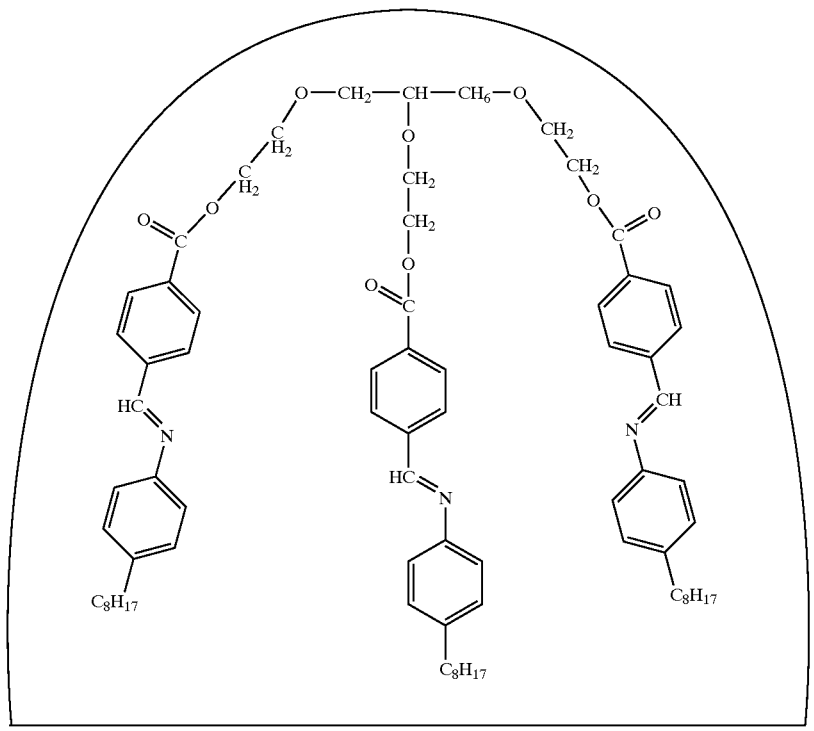
Formula 11
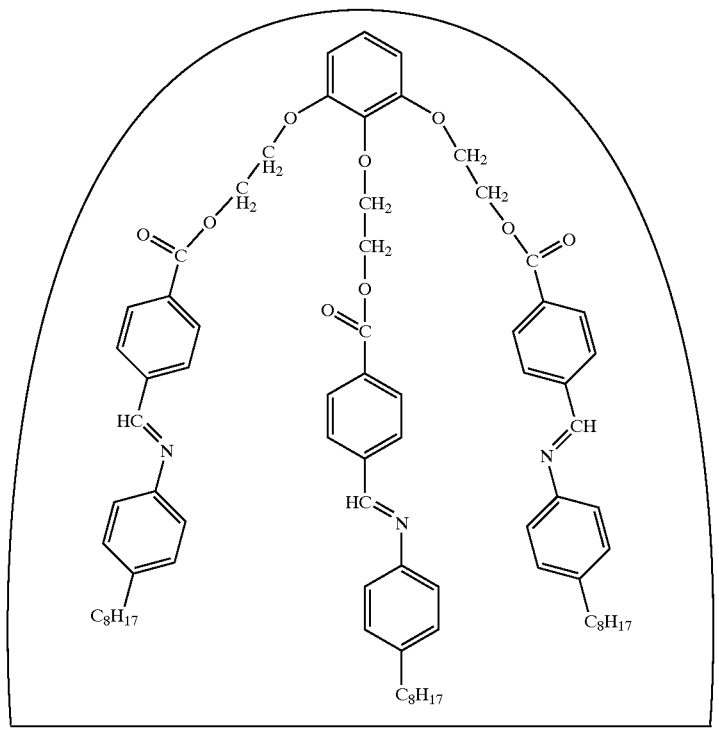

Formula 12

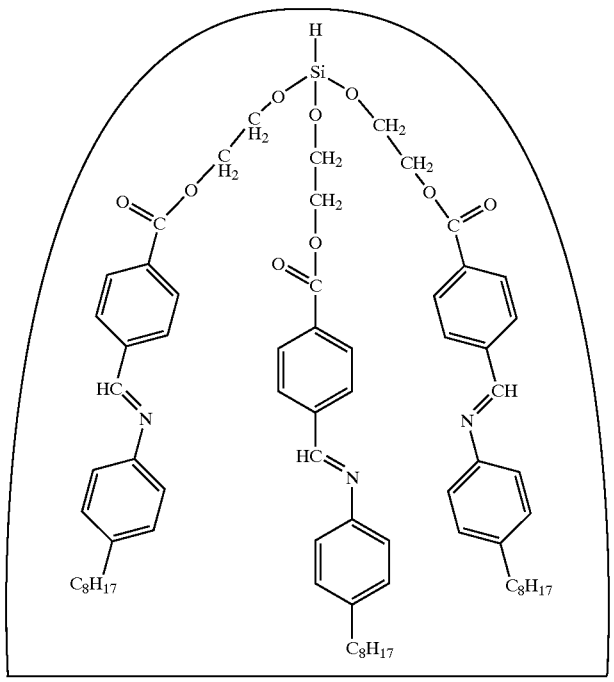

Preferably, each of the ring compound and the nonlinear compound is a compound having a dipole moment. Such a compound having a dipole moment may include, for example, a ring compound having an electron-withdrawing substituent such as those listed in Table 3, a heterocyclic compound such as those listed in Table 4, or a nonlinear compound such as the ketone listed in Table 5 (on the right). With the use of such a ring or nonlinear compound having a dipole moment, the permanent dipole moment of the resultant banana-shaped or cone-shaped (or wedge-shaped) liquid crystal material can be increased. Specific examples of such a liquid crystal material may include the banana-shaped liquid crystal material represented by Formula 7 or 9, and a cone-shaped liquid crystal material represented by Formula 13 or 14.

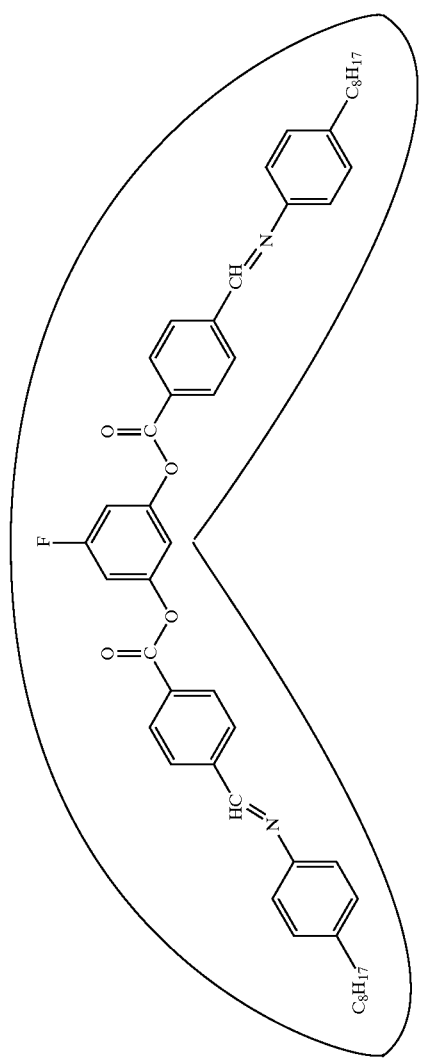
Formula 7
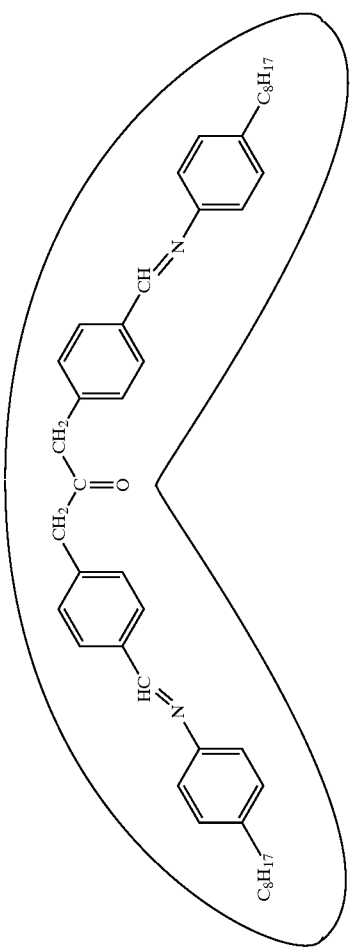
Formula 9

Formula 13
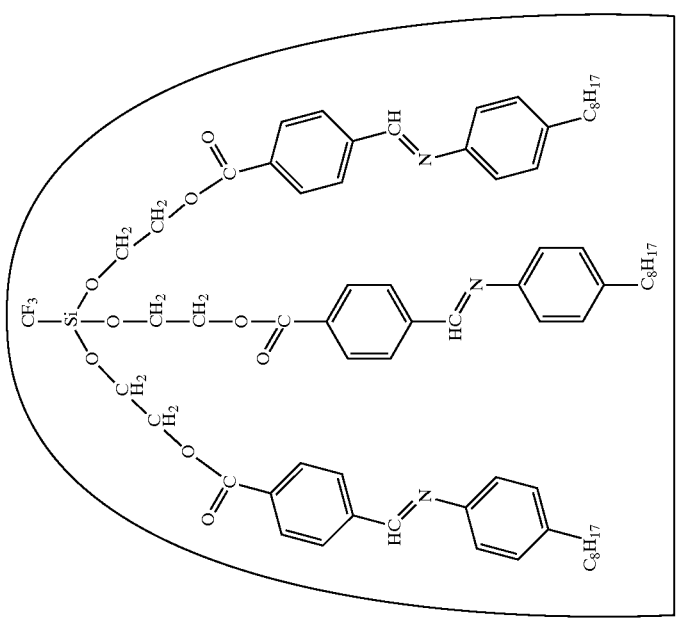

Formula 14
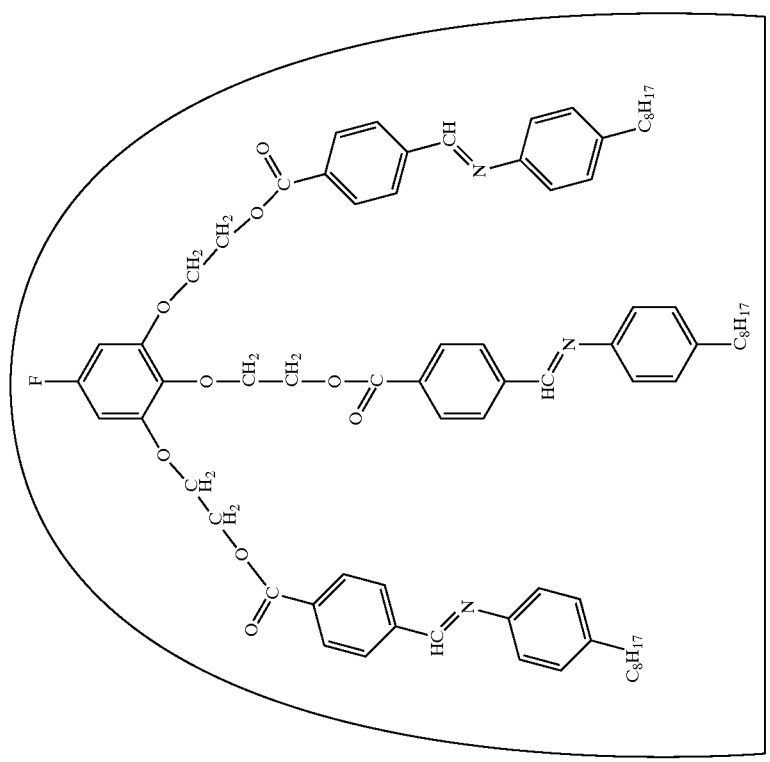

Such a liquid crystal material may be mixed with any suitable additive to be used as a liquid crystal composition for a display medium.

A-2. First driving principle of liquid crystal molecules according to the present invention:

Hereinafter, the driving principle of liquid crystal molecules according to a preferred embodiment of the present invention will be described.

FIGS. 1A to 1D are schematic diagrams illustrating the driving principle of liquid crystal molecules according to the preferred embodiment of the present invention. FIG. 1A is a front view illustrating the liquid crystal display device of the present invention in the absence of an applied voltage; and FIG. 1B is a plan view therefor. FIG. 1C is a plan view illustrating the liquid crystal display device of the present invention in the presence of an applied voltage; and FIG. 1D is a plan view therefor. The arrow 307 in FIGS. 1C and 1D denotes the spontaneous polarization of the liquid crystal layer. The illustrated direction of spontaneous polarization of the liquid crystal molecules and the orientation of the liquid crystal molecules are only exemplary and may vary depending upon the configuration of the liquid crystal display device (e.g., the configuration of the liquid crystal panel, the liquid crystal material and the material of the alignment film).

Referring to FIGS. 1A and 1B, the liquid crystal display device of the present invention in the absence of an applied voltage will be described. As shown in FIGS. 1A and 1B, liquid crystal molecules 305 are homeotropically oriented by any suitable method (e.g., by alignment films 302a and 302b) in the present invention. In the absence of an applied voltage, the director of the liquid crystal molecules 305 is oriented vertical to the surface of the substrates 303a and 303b, whereby the liquid crystal layer does not exhibit refractive index anisotropy in a plane parallel to the substrate surface. Therefore, linearly-polarized light which has passed through a lower polarizer (not shown) reaches an upper polarizer (not shown) without becoming elliptically-polarized light or changing the direction of its optical axis, whereby the linearly-polarized light is completely blocked by the upper polarizer. Thus, it is not necessary to perform an alignment treatment (e.g., the rubbing treatment) to align the liquid crystal molecules parallel to the substrate surface and uniformly in one direction in a plane parallel to the substrate. As a result, unlike the conventional transverse electric field type liquid crystal display device, it is not necessary for the rubbing direction of the upper substrate to be identical to that of the lower or upper substrate, nor is it necessary to precisely adjust the rubbing direction to the polarization axis of the polarizer. Thus, according to the present invention, a transverse electric field type liquid crystal display device having a high contrast can be obtained with a high productive efficiency.

Next, referring to FIGS. 1C and 1D, the liquid crystal display device of the present invention in the presence of an applied voltage will be described.

It can be assumed that, as in the conventional example, as long as the liquid crystal molecules 305 are driven based upon the dielectric anisotropy, even when a transverse electric field is applied to the liquid crystal molecules of a homeotropically-oriented n-type nematic liquid crystal material, the director of the liquid crystal molecules remains unchanged. On the other hand, according to the present invention, the liquid crystal molecules are driven using the piezoelectric effect or the flexoelectric effect. Referring to FIGS. 1C and 1D, an example of how the liquid crystal molecules are driven using the piezoelectric effect will be described.

The illustrated example is the case where a liquid crystal material whose director axis is identical to the axis of the spontaneous polarization is used for the liquid crystal layer. When a transverse electric field E is applied from a power source 306 via electrodes 301a and 301b across the liquid crystal layer containing such a liquid crystal material, the director of the liquid crystal molecules 305 exhibits a bend orientation as shown in FIGS. 1C and 1D. When the polarizers are provided in a manner that the direction 308 of the transverse electric field E and the polarization axis (e.g., the absorption axis) of one of the polarizers (e.g., the lower polarizer) form an angle other than 0° (preferably, about 45°) with respect to each other, the linearly-polarized light which has passed through the lower polarizer undergoes birefringence of the liquid crystal layer and thus becomes elliptically-polarized light, a portion of which passes through the upper polarizer. (The polarizers are provided so that the polarization axis of the upper polarizer is orthogonal to the polarization axis of the lower polarizer.) When the direction of the electric field and the direction of the polarization axis of the polarizer form an angle of about 45° with respect to each other, the transmission becomes maximum for visible light.

In the illustrated example, when the retardation value of the liquid crystal layer is set to be about 250 nm, the maximum transmission is obtained for the wavelength range for visible light. In other words, the driving voltage of the liquid crystal display device according to the illustrated example of the present invention is a voltage such that the retardation value of the liquid crystal layer is about 250 nm. For example, with a liquid crystal panel which employs MBBA as a liquid crystal material, and which has a configuration as shown in FIGS. 1A to 1D, and a panel gap of about 5 $\mu$m, the field strength required for the retardation value to be about 250 nm has been actually found to be about 0.08 V/$\mu$m, which is considerably smaller than the field strength (about 1 V/$\mu$m) in the conventional transverse electric field type liquid crystal display device. Thus, when the length of the short side of one pixel is set be about 80 $\mu$m, the driving voltage is about 6.4 V, whereby the device can be driven only by the pair of electrodes 301a and 302b provided on opposite ends of the pixel even when employing an ordinary matrix driving system. As a result, according to the present invention, it is possible to eliminate the additional electrode in a pixel required in the conventional technique. Accordingly, a liquid crystal display device having a higher aperture ratio can be obtained.

A-3. Spontaneous polarization and orientation of liquid crystal molecules:

Hereinafter, referring to FIGS. 2A to 2C, spontaneous polarization and orientation of the liquid crystal molecules will be described. As an example, a liquid crystal display device with polarizers in which a liquid crystal material having a banana-like molecular shape is homeotropically oriented and is driven by a transverse electric field will be described.

FIG. 2A is a schematic diagram illustrating the individual liquid crystal molecules in the liquid crystal layer in the absence of an applied voltage. In the figure, reference numerals 403 and 404 each denote a substrate for which the homeotropic alignment treatment is performed; and 402 denotes the permanent dipole moment of the liquid crystal molecules. In the absence of an applied voltage, the individual liquid crystal molecules 305 have the major axis oriented generally in one direction (vertical to the substrate). However, since the molecules are allowed to rotate freely about the major axis thereof, the minor axis of the liquid crystal molecules 305 are oriented in different directions. Therefore, the liquid crystal layer as a whole does not exhibit spontaneous polarization, and refractive index anisotropy is not exhibited in a plane parallel to the substrates 403 and 404.

Figure 2B:
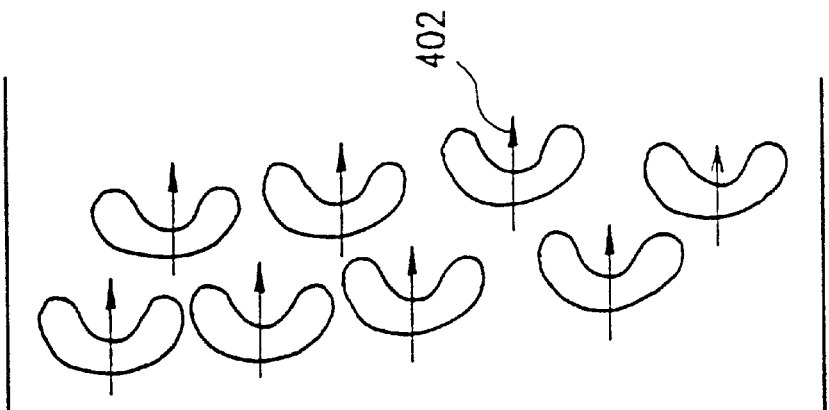
Figure 2C:
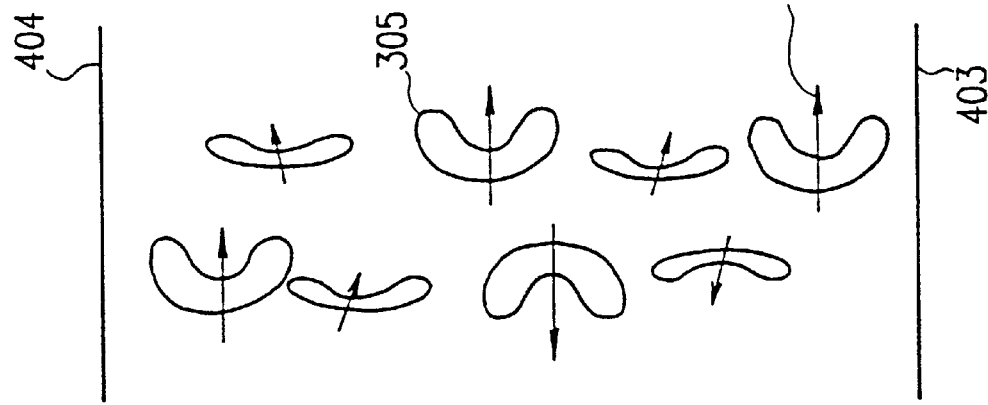

When a transverse electric field is applied, the electric field acts upon the permanent dipole moments 402 so that the permanent dipole moments 402 have certain directions, whereby spontaneous polarization is generated by the piezoelectric effect in the direction denoted by the arrow 405 in a macroscopic region, as shown in FIG. 2B. When such spontaneous polarization is generated, the liquid crystal molecules 305 are oriented in a bend orientation, as shown in FIG. 2C, due to the banana shape of the liquid crystal molecules. This is because such a situation is energetically stable. As a result, the liquid crystal layer as a whole exhibits refractive index anisotropy.

Figure 3A:
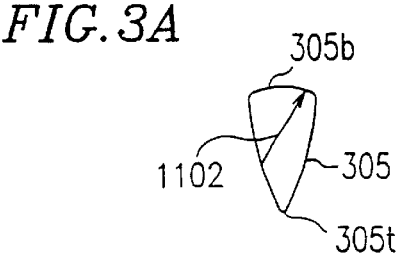
FIGS. 3A to 3G are schematic diagrams illustrating spontaneous polarization of cone-shaped liquid crystal molecules and the orientation thereof in the liquid crystal display device of the present invention.

When the liquid crystal material has a generally conical (or wedge-like) molecular shape, spontaneous polarization is generated in the liquid crystal layer based on a mechanism as shown in FIGS. 3A to 3G. As an example, the case where cone-shaped liquid crystal molecules are homeotropically oriented, as shown in FIG. 3A, will be described. The direction of a permanent dipole moment 1102 is not identical to that of the major or minor axis of the liquid crystal molecules 305. The major axis direction of the liquid crystal molecules is defined by the top 305t and the center of the bottom face 305b of the cone, whereas the minor axis direction of the liquid crystal molecules is parallel to the bottom face 305b.

Figure 3B:
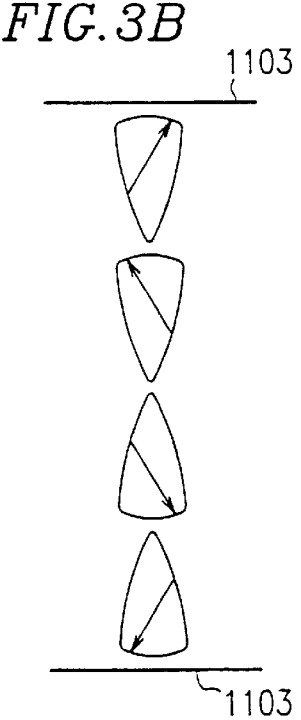
Figure 3C:
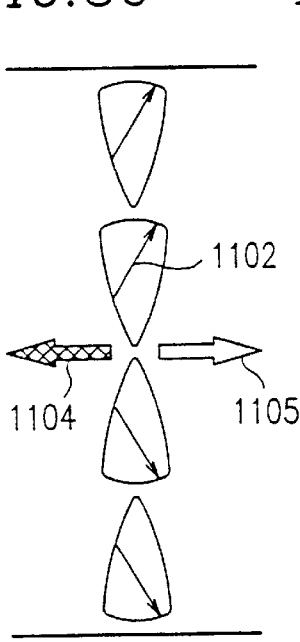
Figure 3D:
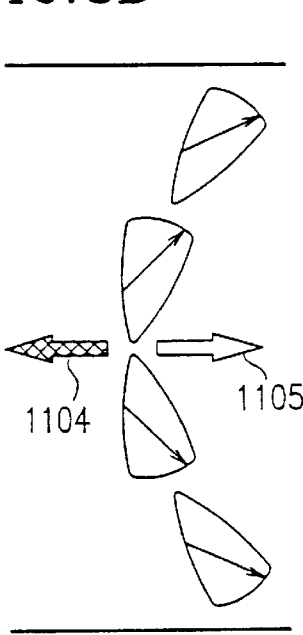
Figure 3E:
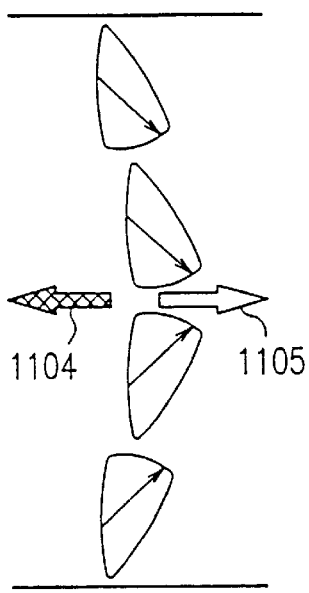
Figure 3F:
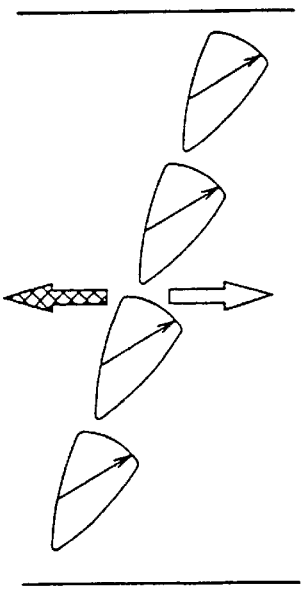
Figure 3G:
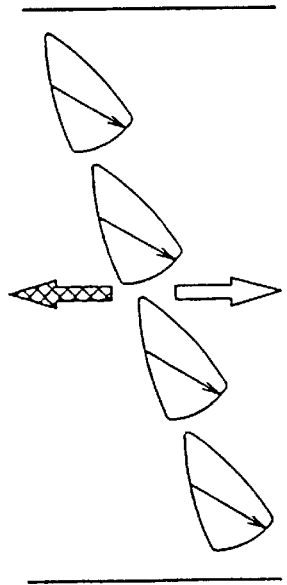

As shown in FIG. 3B, in the absence of an applied electric field, the liquid crystal molecules in the liquid crystal layer, which is provided between substrates 1103 and 1103 for which the homeotropic alignment treatment is performed, can rotate freely about the major axis thereof, whereby spontaneous polarization is not generated. However, when a transverse electric field 1104 is externally applied, the permanent dipole moments 1102 of the individual liquid crystal molecules 305 have certain directions, as shown in FIG. 3C, resulting in a bend orientation, as shown in FIG. 3D. As a result, the liquid crystal layer as a whole exhibits spontaneous polarization as shown in FIG. 3D (in the direction denoted by the arrow 1105) while exhibiting refractive index anisotropy in a plane parallel to the substrate surface. When using a liquid crystal material which has a conical molecular shape, as shown in FIG. 3A, there are four possible modifications, as shown in FIGS. 3D to 3G, depending upon whether the top 305t or the bottom face 305b is in contact with the substrate surface. Moreover, any combination of the four modifications is possible. In any case, the liquid crystal layer as a whole exhibits spontaneous polarization in the direction denoted by the arrow 1105.

A-4. Increase in response speed of liquid crystal display device:

Moreover, according to the present invention, a liquid crystal display device having a high response speed can be obtained. The reason therefor will be described below.

According to the present invention, unlike the above-described conventional liquid crystal display device, the liquid crystal layer may generate spontaneous polarization due to the use of the above-described liquid crystal material. Therefore, both when a voltage is applied and the field strength thus increases and when application of voltage is stopped and the field strength thus decreases, the liquid crystal molecules are driven with a driving force provided by the interaction between spontaneous polarization and an electric field. As a result, the response speed when the field strength decreases and that when the field strength increases are comparable to each other, whereby the response speed of the liquid crystal display device as a whole is increased. Particularly, the response speed when application of voltage is stopped is remarkably increased.

B. Second Driving Principle of Liquid Crystal Molecules According to the Present Invention B-1. Liquid crystal material:

A liquid crystal material used in another embodiment of the present invention is a liquid crystal material (preferably, an n-type nematic liquid crystal material) which has different refractive indices ($n_x$, $n_y$, $n_z$) for each of the X, Y and Z directions and has different dielectric constants ($\epsilon_x$, $\epsilon_y$, $\epsilon_z$) for each of the X, Y and Z directions in the XYZ system of coordinates with the z axis being the major axis direction of the molecules. Typically, if the refractive index components $n_x$, $n_y$, $n_z$ are different from one another, the dielectric constant components $\epsilon_x$, $\epsilon_y$, $\epsilon_z$ should accordingly be different from one another. In view of exceptions, the liquid crystal material used in the present embodiment is defined to have different refractive index components ($n_x$, $n_y$, $n_z$) and different dielectric constant components ($\epsilon_x$, $\epsilon_y$, $\epsilon_z$). Using such a liquid crystal material, refractive index anisotropy can be exhibited in the x-y plane of the liquid crystal layer by rotating the liquid crystal molecules about the major axis thereof with an applied transverse electric field.

Examples of such a liquid crystal material may include the compounds shown below. Both of these compounds satisfy $n_z > n_x$, $n_z > n_y$, $n_x \neq n_y$, and may generate refractive index anisotropy in the x-y plane with an applied transverse electric field. Where, R is any suitable substituent (e.g., an alkyl group, an alkoxy group).

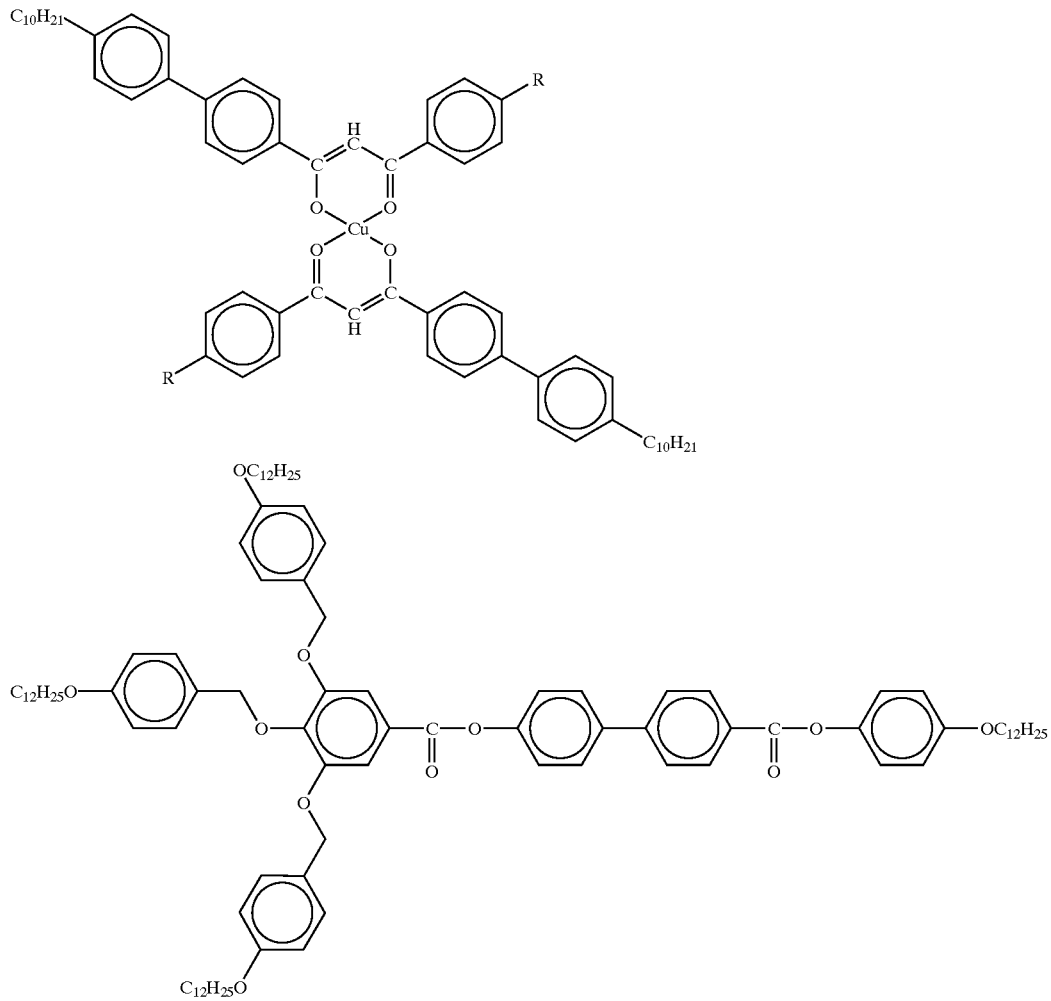

Alternative liquid crystal material which may be employed is such that at least one of the X component and the Y component of the permanent dipole moment of the liquid crystal molecules is not zero (i.e., the permanent dipole moment component in a plane parallel to the substrate is not zero), and the X, Y and Z components of the refractive index are different from one another. When such a liquid crystal material is used, a transverse electric field acts upon the permanent dipole moment of the liquid crystal molecules so that the liquid crystal molecules rotate about the Z axis, thereby generating refractive index anisotropy in the x-y plane.

Figure 4A:
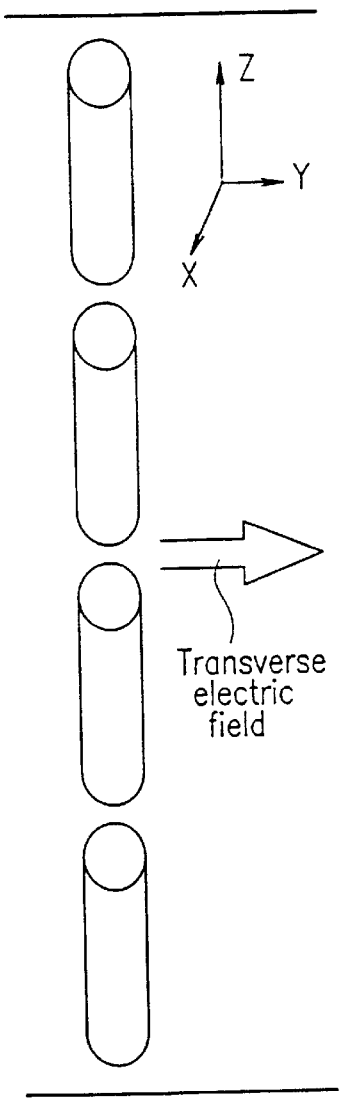
FIGS. 4A to 4C are schematic diagrams illustrating refractive index anisotropy exhibited in a liquid crystal layer by rotating liquid crystal molecules, which have different refractive indices for each of the X, Y and Z directions and different dielectric constants for each of the X, Y and Z directions, about the major axis thereof by applying a transverse electric field.
Figure 4B:
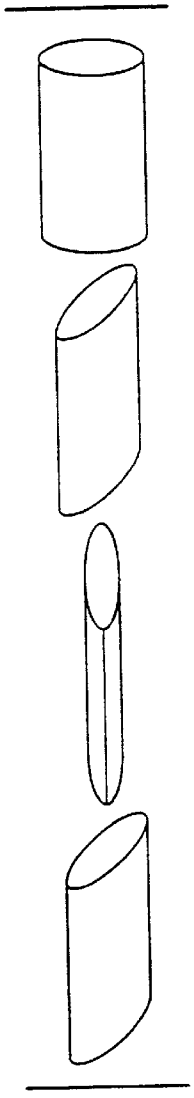
Figure 4C:
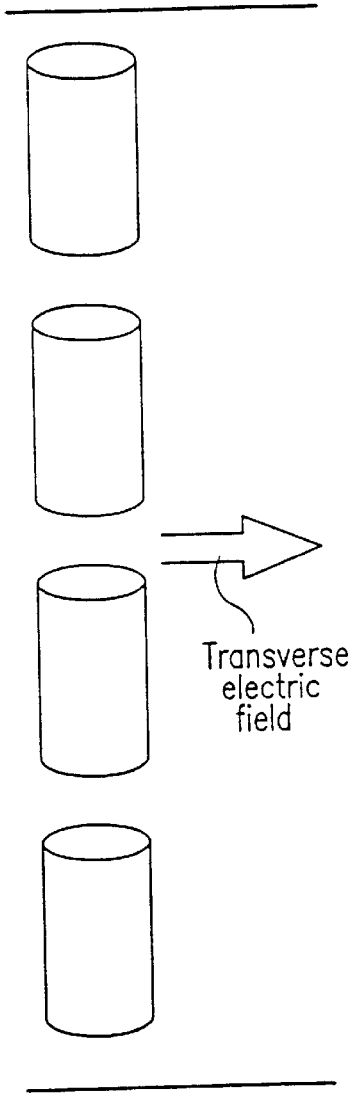

B-2. Second driving principle of liquid crystal molecules according to the present invention:

Referring to FIGS. 4A to 4C, the driving principle of the liquid crystal molecules according to the present embodiment will be described.

FIG. 4A is a schematic diagram illustrating the liquid crystal material where $n_z > n_x$, $n_z > n_y$, $n_x = n_y$ in the presence of an applied transverse electric field; FIG. 4B is schematic diagram illustrating a liquid crystal material where $n_z > n_x$, $n_z > n_y$, $n_x \neq n_y$, and $\epsilon_z < \epsilon_x$, $\epsilon_z < \epsilon_y$, $\epsilon_x \neq \epsilon_y$ in the absence of an applied transverse electric field; and FIG. 4C is a schematic diagram illustrating the liquid crystal material where $n_z > n_x$, $n_z > n_y$, $n_x \neq n_y$, and $\epsilon_z < \epsilon_x$, $\epsilon_z < \epsilon_y$, $\epsilon_x \neq \epsilon_y$ in the presence of an applied transverse electric field.

In an ordinary n-type nematic liquid crystal material, the X component and the Y component of the refractive index are equal to each other, as shown in FIG. 4A, whereby the liquid crystal layer does not exhibit refractive index anisotropy in a plane parallel to the substrate (i.e., in the x-y plane). On the contrary, the present invention employs a liquid crystal material which has different refractive indices for each of the X, Y and Z directions and different dielectric constants for each of the X, Y and Z directions. Therefore, in the absence of an applied transverse electric field, the arrangement of the liquid crystal molecules is random as viewed in a direction normal to the substrate (i.e., in the x-y plane), whereby the liquid crystal layer does not exhibit refractive index anisotropy (FIG. 4B). In the presence of an applied transverse electric field, the transverse electric field acts upon the dielectric anisotropy in the x-y plane so that the liquid crystal molecules rotate about the Z axis, as shown in FIG. 4C. As a result, the liquid crystal layer exhibits refractive index anisotropy in the x-y plane. In this way, it is possible to vary the light transmission across the entire liquid crystal display device in accordance with the magnitude of the transverse electric field. Moreover, in such a driving mode based on a transverse electric field, the movement of the liquid crystal molecules is less than that in a conventional driving mode (e.g., the TN mode), whereby a high response speed can be obtained.

C. Displaying High Definition Image

The liquid crystal display device of the present invention may be used in the matrix driving mode. In the matrix driving mode, a plurality of electrodes are individually driven with a lesser number of lead wires. In such a case, the electrode and the lead wire may be connected with each other via an active element such as a transistor, or they may be connected with each other via a gas layer whose electric conductivity can be varied through discharge or the like.

The present invention employs a liquid crystal material which has the electro-optical characteristics described in the above sections A and B, whereby it is possible to drive the liquid crystal molecules with a low voltage suitable for the matrix driving mode. As a result, the present invention, unlike the technology in the above U.S. Pat. No. 3,687,515, does not require a great number of electrodes to be provided. Therefore, it is possible to realize higher definition pixels, and thus to realize a liquid crystal display device which can display a high definition image.

D. Embodiments of Liquid Crystal Display Device of the Present Invention

Embodiment 1

Figure 5:
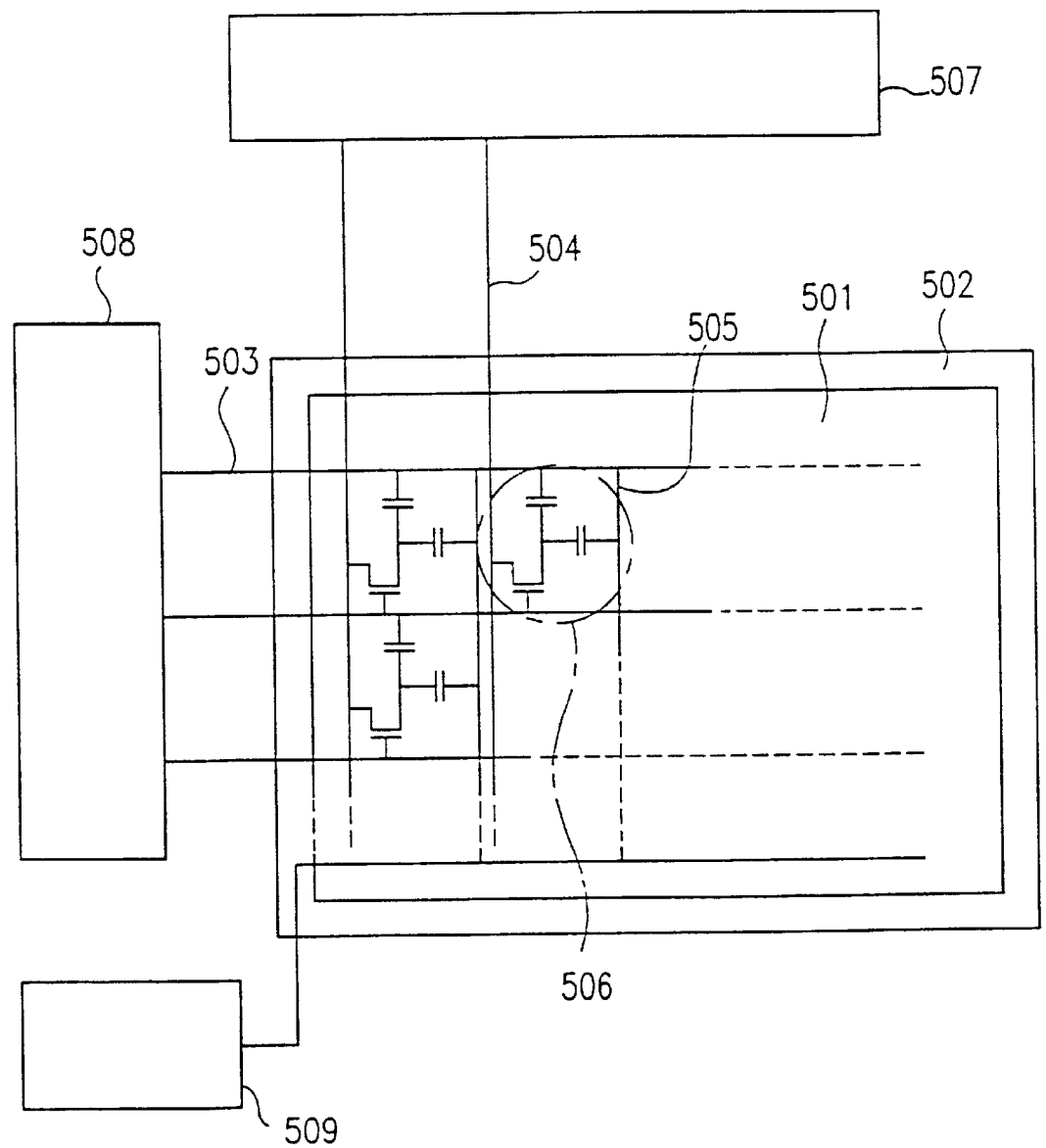
FIG. 5 is a schematic plan view illustrating a liquid crystal display device according to a preferred embodiment of the present invention.
Figure 6:
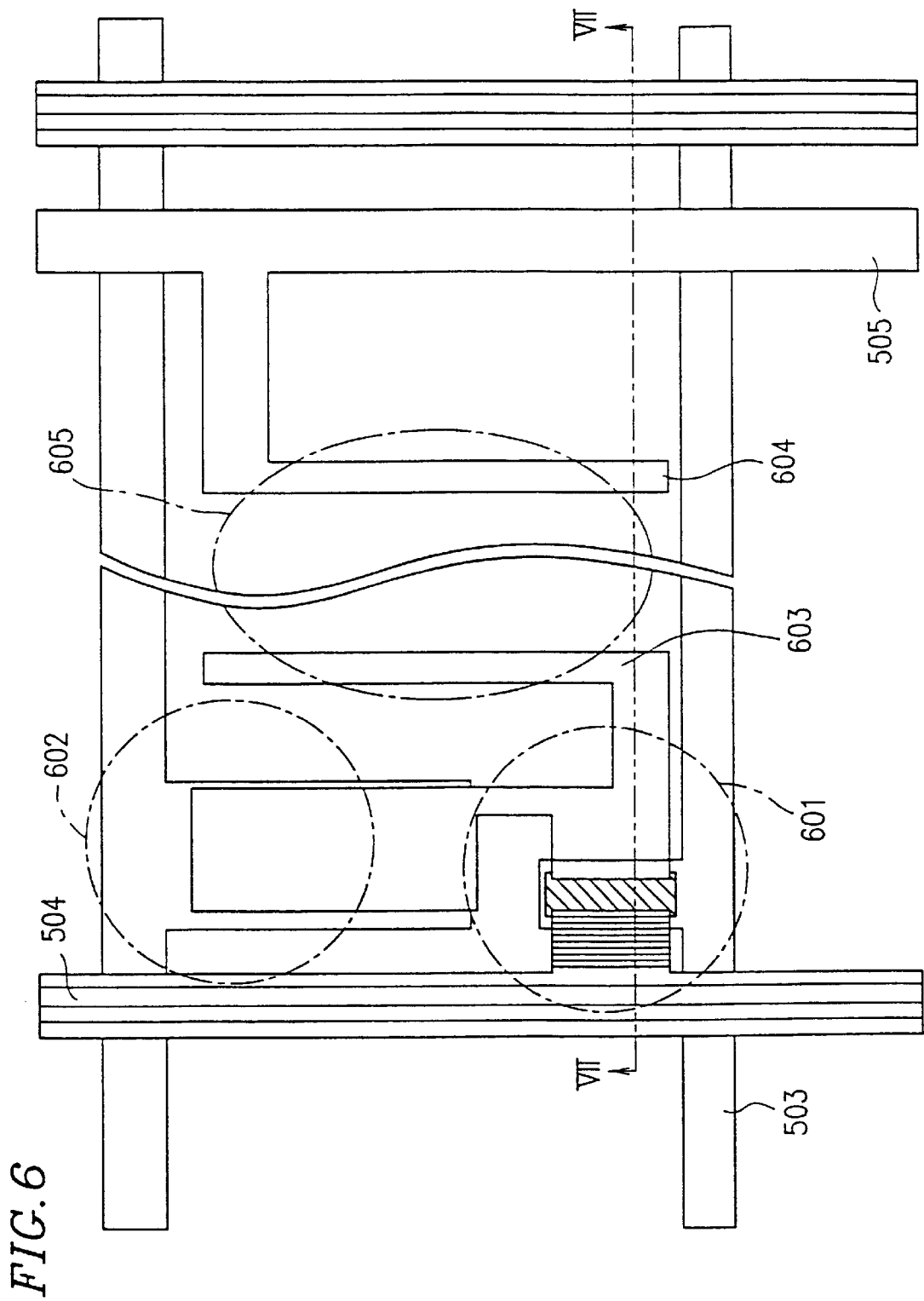
FIG. 6 is a schematic plan view illustrating a one-pixel portion of the liquid crystal display device of FIG. 5.
Figure 7:
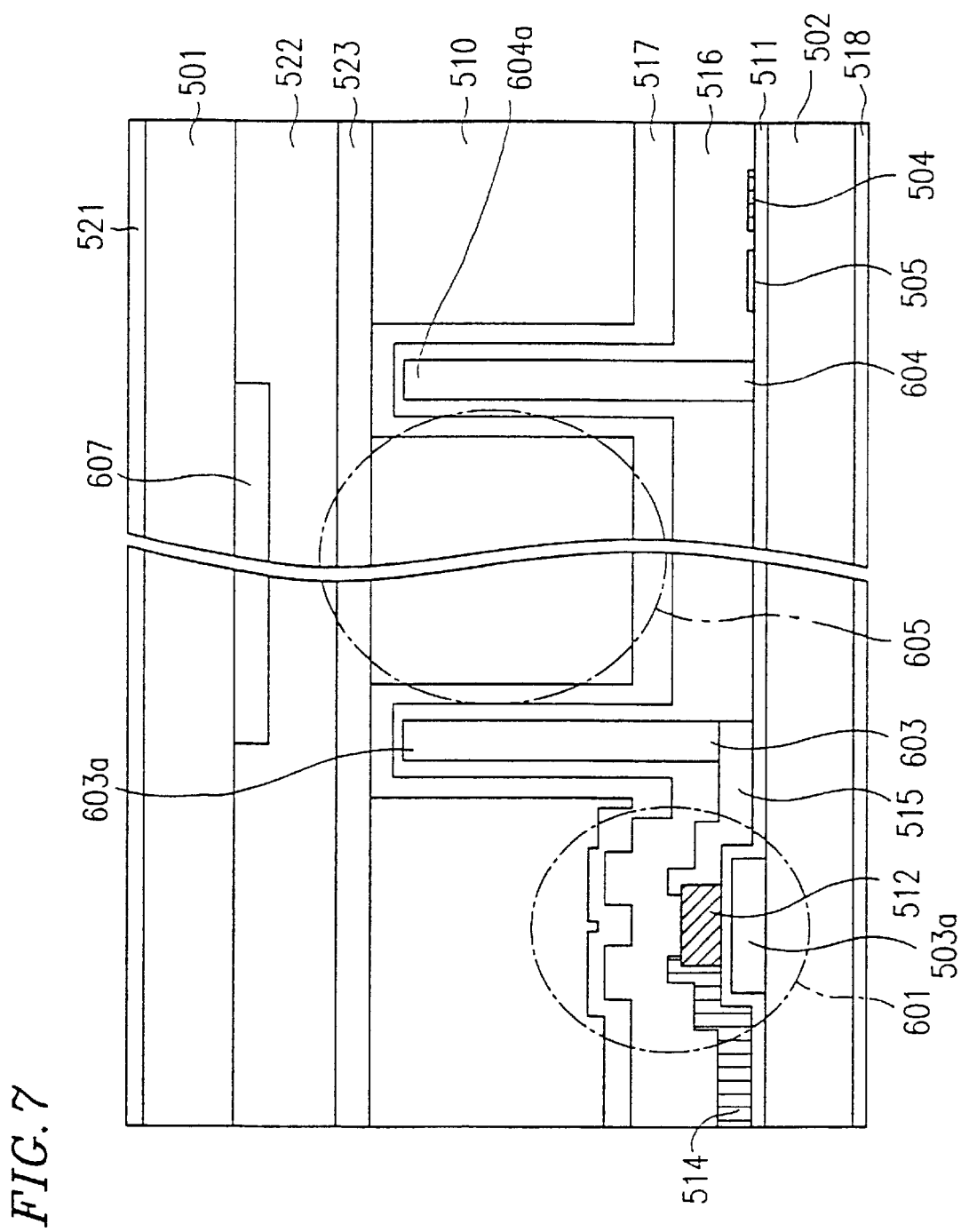
FIG. 7 is a cross-sectional view taken along the line VII—VII in FIG. 6.

Referring to FIGS. 5 to 7, a liquid crystal display device according to a preferred embodiment of the present invention will be described. FIG. 5 is a schematic plan view illustrating the liquid crystal display device; FIG. 6 is a schematic plan view illustrating a one-pixel portion of the liquid crystal display device illustrated in FIG. 5; and FIG. 7 is a cross-sectional view taken along the line VII—VII in FIG. 6.

The liquid crystal display device includes a pair of substrates 501 and 502, and a liquid crystal layer 510 containing an n-type nematic liquid crystal material provided between the substrates. The liquid crystal material (n-type nematic liquid crystal material) to be contained in the liquid crystal layer is one defined above.

A thin film transistor (TFT) element 601 is provided on the lower substrate 502 on the liquid crystal layer side thereof. The TFT element includes a scanning line 503; a gate electrode 503a branching from the scanning line; an insulating layer 511 covering the substrate on which the scanning lines are formed; a semiconductor layer 512 provided on a portion of the insulating layer 511 over the gate electrode 503a; and a source electrode 514 and a drain electrode 515 formed separated from each other on the semiconductor layer 512.

The source electrode 514 is a branched portion of a signal line 504 formed on the insulating layer 511. Of a pair of transverse electric field electrodes 603 and 604, the electrode 603 is connected to the drain electrode 515. The other electrode 604 is formed on the insulating layer 511, and is connected to a common line 505 which is also formed on the insulating layer 511. Moreover, an insulating film 516 is formed covering the substrate on which these components are formed, and an alignment film 517 is formed on the insulating film 516. Thus, an active matrix substrate is configured. A polarizer 518 is provided on the opposite side of the substrate 502 with respect to the liquid crystal layer 510.

A pixel display section 605, where the liquid crystal layer 510 is driven by applying a transverse electric field across the liquid crystal layer 510, is provided interposed between the transverse electric field electrodes 603 and 604.

A polarizer 521 is provided on the opposite side of the substrate 501 with respect to the liquid crystal layer 510. The substrate 501 is the substrate provided on the opposite side of the liquid crystal layer 510 with respect to the active matrix substrate. A color filter 607 is formed on the substrate 501 on the liquid crystal layer side so as to face the pixel display section 605. A flattening film 522 is formed on the color filter 607. An alignment film 523 is formed on the flattening film 522. The alignment treatment is performed on the alignment films 523 and 517 for homeotropically orienting the liquid crystal molecules in the liquid crystal layer 510.

The transverse electric field electrodes 603 and 604 extend upward from the substrate 502, with top surfaces 603a and 604a thereof being secured to the alignment film 523 on the substrate 501 via the insulating film 516 and the alignment film 517. Since the transverse electric field electrodes extend to be on the counter substrate via the insulating film 516 and the alignment film 517, the transverse electric field electrodes can function as a spacer as well as the liquid crystal molecules can be satisfactorily driven across the entire depth of the liquid crystal layer. The height of the transverse electric field electrode may be adjusted to any appropriate height. As the height of the transverse electric field electrode is decreased, the production cost of the liquid crystal display device may be reduced accordingly.

Video signals are supplied from a signal driving circuit 507 to the signal lines 504 of the liquid crystal display device. Scanning signals are supplied from a scanning driving circuit 508 to the scanning lines 503. A common voltage is supplied from a common voltage generating circuit 509 to the common lines 505.

Figure 8:
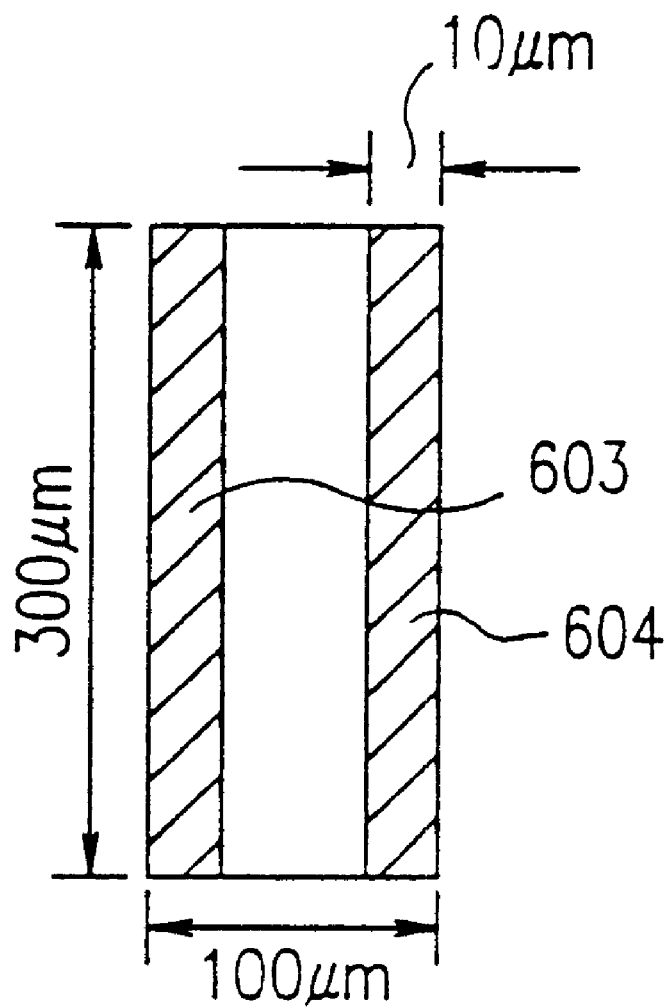
FIG. 8 is a schematic diagram illustrating dimensions of a pair of transverse electric field electrodes of the liquid crystal display device of FIG. 5.

The liquid crystal display device according to the present embodiment is a matrix driving type liquid crystal display device which may be produced by any appropriate method. In the liquid crystal display device which has been actually produced according to the present embodiment, the pixel display section 605 includes 640×400×3 pixels, and has a diagonal line of about 12 inches and a cell gap of about 5 $\mu$m. As shown in FIG. 8, the transverse electric field electrodes 603 and 604 both have a length of about 300 $\mu$m along the substrate surface (i.e., in a direction orthogonal to the direction of a generated electric field), and a width of about 10 $\mu$m. The distance between the respective outer sides of the electrodes is about 100 $\mu$m. The pixel pitch is about 136 $\mu$m.

Figure 9:
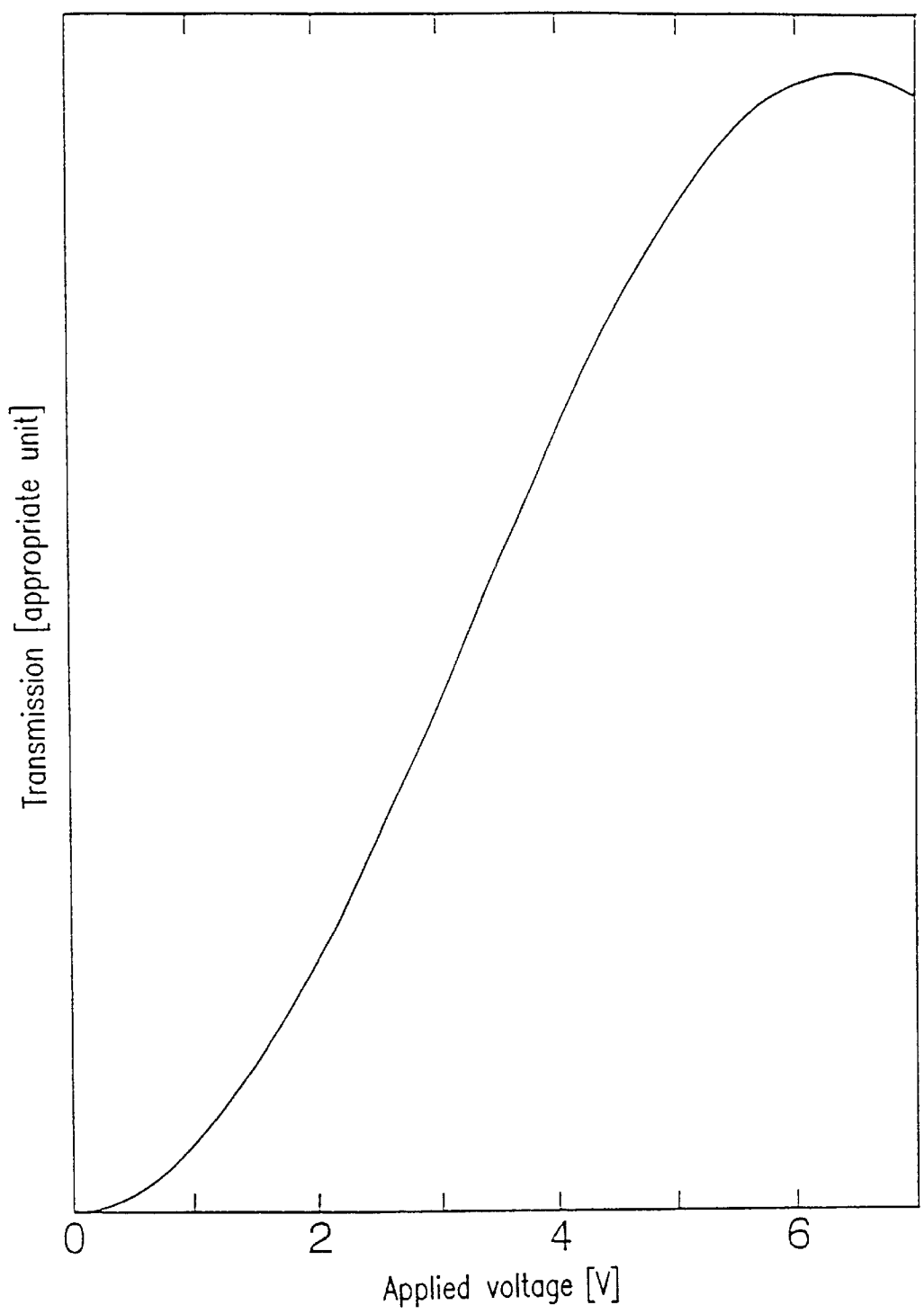
FIG. 9 is a graph showing a voltage-transmission characteristic measured when a certain voltage is applied across all pixel display portions of a liquid crystal display device according to the present invention which employs MBBA for the liquid crystal layer.

FIG. 9 is a graph showing the voltage-transmission characteristic measured when a certain voltage is applied across all pixel display portions of a liquid crystal display device according to the present invention which employs p-butyl-N-(p'-methoxy-benzylidene)aniline (MBBA) having a banana-like molecular shape, for the liquid crystal layer. As is apparent from FIG. 9, the strength of a transverse electric field required to achieve the maximum transmission is about 0.08 V/$\mu$m, which is considerably smaller than the field strength (about 1 V/$\mu$m) in the conventional transverse electric field type liquid crystal display device. Thus, the driving voltage is only about 6.4 V when only a pair of transverse electric field electrodes are provided within a pixel whose short side is about 80 $\mu$m. As a result, the additional electrode in a pixel required in the conventional technique is no longer needed, thereby increasing the aperture ratio of the liquid crystal display device. Thus, in the liquid crystal display device of the present invention, a high transmission can be achieved with a low voltage.

When a still image and a motion picture were actually displayed on the liquid crystal display device, which was connected to a typical driving circuit for a liquid crystal display device (including the signal driving circuit 507, the scanning driving circuit 508 and the common voltage generating circuit 509), an excellent image with a high contrast was obtained.

Embodiment 2

A Schiff-type compound (Formula 1) which is a rodlike compound exhibiting liquid crystallinity was condensed with an alcohol compound (Formula 2). The banana-shaped liquid crystal material represented by Formula 3 was obtained when n=3 in Formula 2, and the generally linear liquid crystal material represented by Formula 4 was obtained when n=2 in Formula 2.

Thus, a liquid crystal display device having a high aperture ratio was obtained. Moreover, a high contrast image was obtained when a still image and a motion picture were displayed.

On the other hand, with a liquid crystal display device using the compound represented by Formula 4, a liquid crystal display device having such desirable characteristics was not obtained.

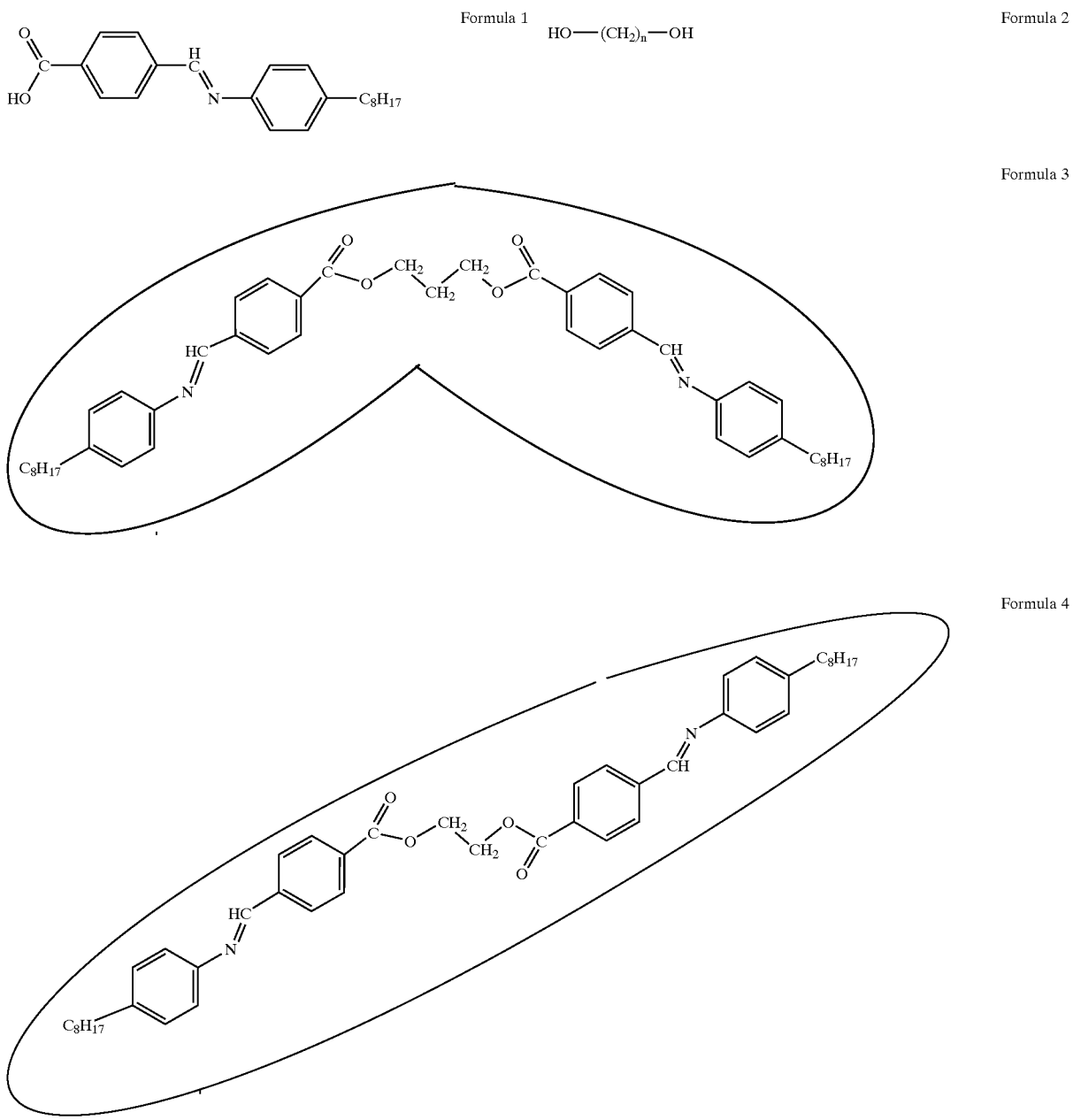

A liquid crystal display device as in Embodiment 1 was produced using the banana-shaped liquid crystal material represented by Formula 3, and the characteristics thereof were examined. As a result, it was possible to substantially increase the light transmission thereof at a low voltage.

Embodiment 3

A Schiff-type compound (Formula 1) having a carboxyl group which is a rodlike compound exhibiting liquid crystallinity was condensed with an alcohol-type ring compound (dihydroxybenzene, Formula 5) under an appropriate condition so as to obtain the banana-shaped liquid crystal material represented by Formula 6.

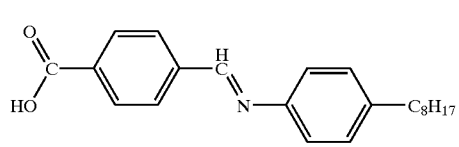

Formula 1

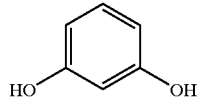

Formula 5

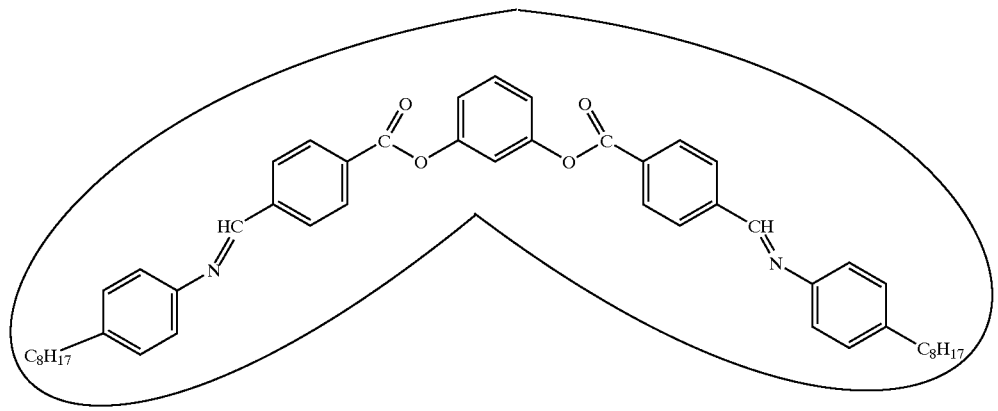

Formula 6

A liquid crystal display device as in Embodiment 1 was produced using the banana-shaped liquid crystal material represented by Formula 6, and the characteristics thereof were examined. As a result, it was possible to substantially increase the transmission thereof at a low voltage. Thus, a liquid crystal display device having a high aperture ratio was obtained. Moreover, a high contrast image was obtained when a still image and a motion picture were displayed.

Moreover, a liquid crystal display device having similarly desirable characteristics is obtained when each of the ring compounds listed in Table 2 (e.g., compounds where $R_1$ is OH and $R_2$ is OH) is used instead of dihydroxybenzene represented by Formula 5.

Embodiment 4

A Schiff-type compound (Formula 1) having a carboxyl group which is a rodlike compound exhibiting liquid crystallinity was condensed with a compound having a fluorine-substituted phenyl group under a suitable condition so as to obtain the banana-shaped liquid crystal material represented by Formula 7.

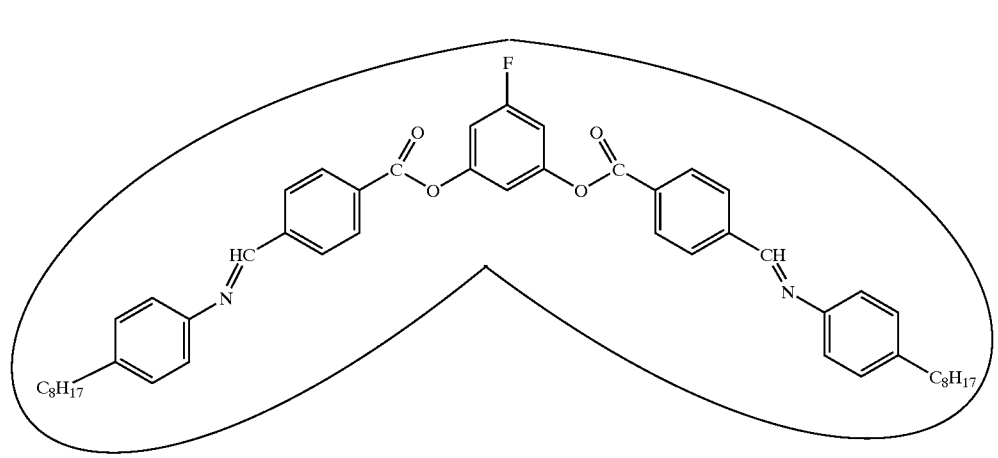

Formula 7

The liquid crystal material represented by Formula 7 had a permanent dipole moment greater than that of the liquid crystal material represented by Formula 6. The reason therefor will be described below with reference to FIGS. 10A, 10B, 11A and 11B.

Figure 10A:
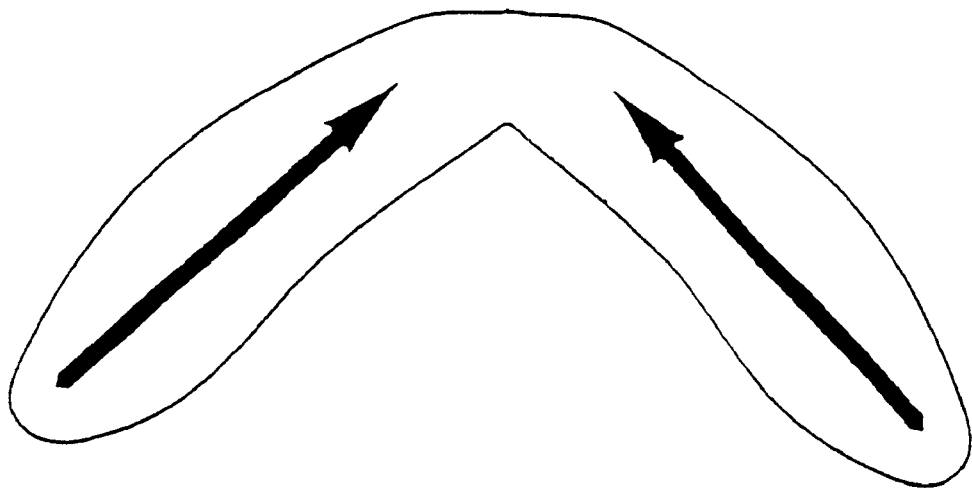
FIGS. 10A and 10B are schematic diagrams illustrating permanent dipole moment of a liquid crystal material according to an embodiment of the present invention.
Figure 10B:
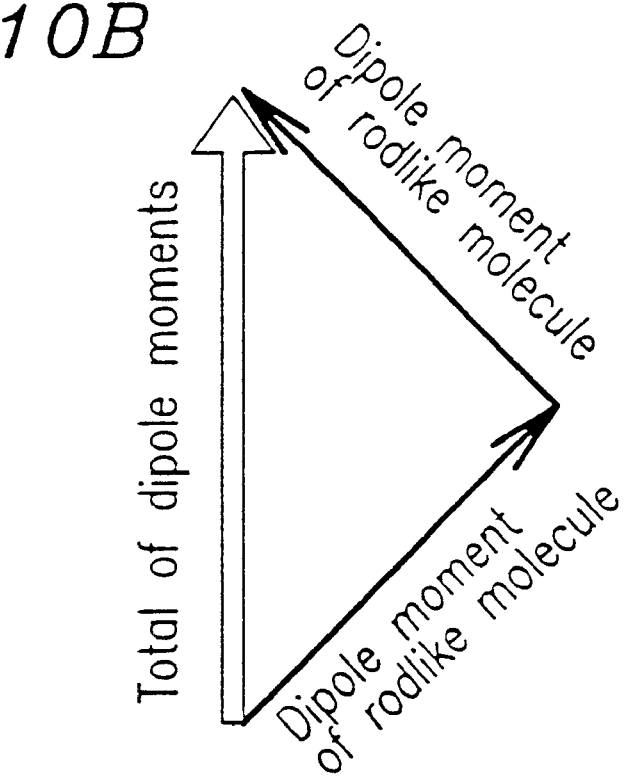
Figure 11A:
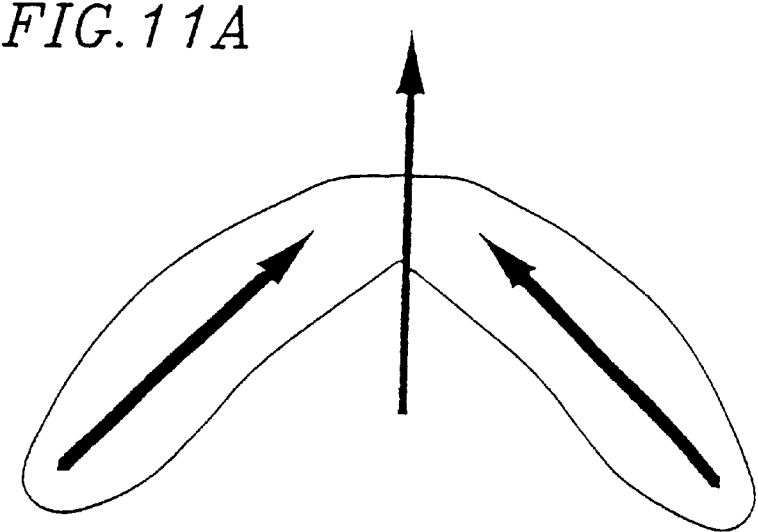
FIGS. 11A and 11B are schematic diagrams illustrating permanent dipole moment of a liquid crystal material according to another embodiment of the present invention.
Figure 11B:
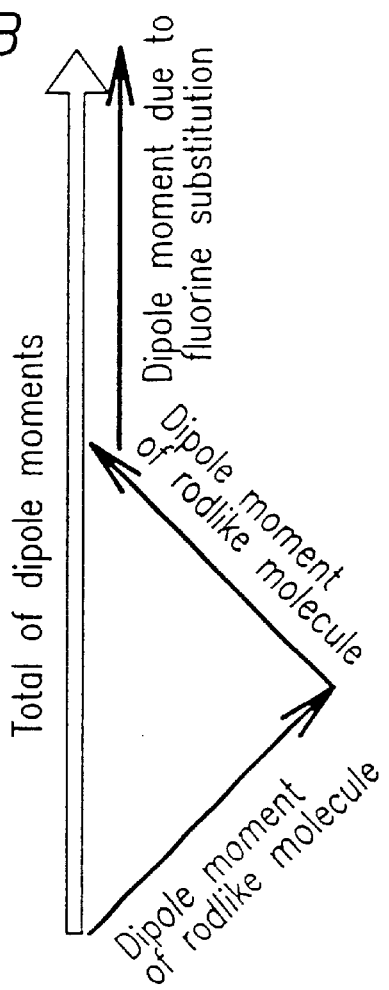
Figure 12A:
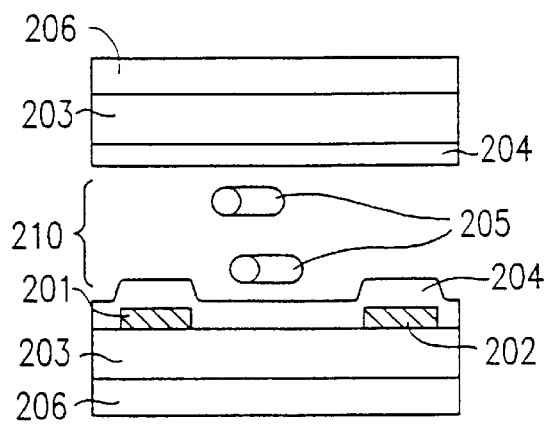
FIGS. 12A to 12D are schematic diagrams illustrating a configuration of a conventional transverse electric field type liquid crystal display device.
Figure 12B:
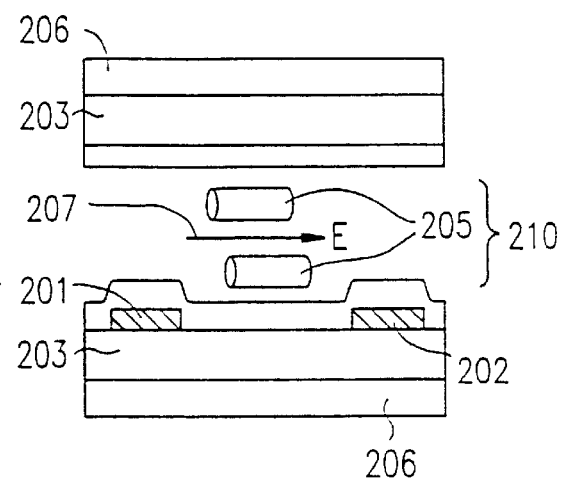
Figure 12C:
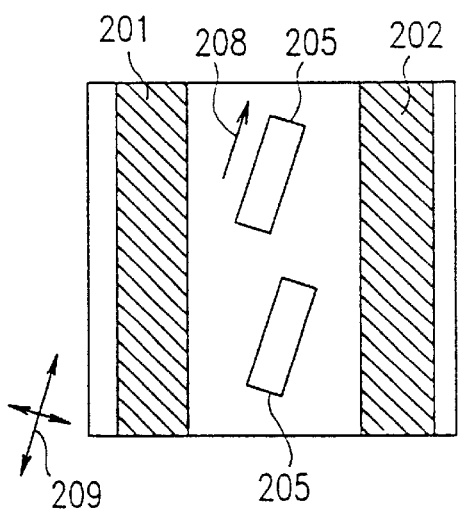
Figure 12D:
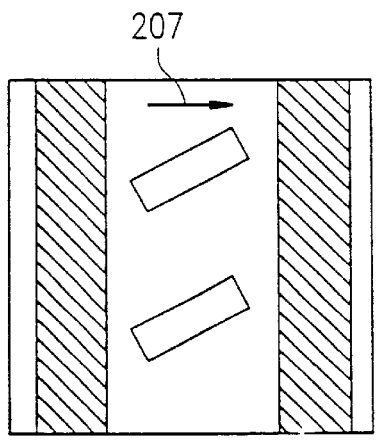

FIG. 10A is a schematic diagram illustrating dipole moments of rodlike portions and a linking portion of the liquid crystal material molecule represented by Formula 6; and FIG. 10B is a schematic diagram illustrating the permanent dipole moment of the liquid crystal material represented by Formula 6. FIG. 11A is a schematic diagram illustrating dipole moments of rodlike portions and a linking portion of the liquid crystal material molecule represented by Formula 7; and FIG. 11B is a schematic diagram illustrating the permanent dipole moment of the liquid crystal material represented by formula 7.

The difference between the liquid crystal material represented by Formula 6 and that represented by Formula 7 is the presence of the permanent dipole moment due to the fluorine substituent at the center (i.e., a linking portion) of the banana-shaped molecule. As is apparent from comparing FIG. 10B with FIG. 11B, the permanent dipole moment of the liquid crystal material molecule represented by Formula 7 is greater than that of the liquid crystal material molecule represented by Formula 6.

A liquid crystal display device as in Embodiment 3 was produced using the liquid crystal material represented by Formula 7, and the characteristics thereof were examined. As a result, the response speed was higher than that of the liquid crystal display device according to Embodiment 3 (the liquid crystal display device using the liquid crystal material represented by Formula 6). Moreover, it was possible to substantially increase the transmission thereof at a low voltage. Thus, a liquid crystal display device having a high aperture ratio was obtained. Furthermore, a high contrast image was obtained when a still image and a motion picture were displayed. Still furthermore, since an additional electrode in a pixel is no longer needed, the designing of the driving circuit was facilitated while it was also possible to reduce the power consumption of the liquid crystal display device.

Moreover, when each of the ring compounds listed in Tables 3 and 4 (e.g., compounds where $R_1$ is OH and $R_2$ is OH) is used instead of the compound having a fluorine-substituted phenyl group, the effect of increasing the permanent dipole moment of the liquid crystal material is similarly obtained, whereby a liquid crystal display device having a high aperture ratio, a high contrast, a low driving voltage and a high response speed is obtained.

Embodiment 5

A rodlike compound having a structure similar to that represented by Formula 1 was reacted with ethylene. The banana-shaped liquid crystal material represented by Formula 8 was obtained when the synthesis was performed so that the rodlike portion derived from the rodlike compound takes the cis form with respect to the ethylene group. The generally linear liquid crystal material was obtained when the synthesis was performed so that the rodlike portion derived from the rodlike compound takes the trans form with respect to the ethylene group.

Formula 8

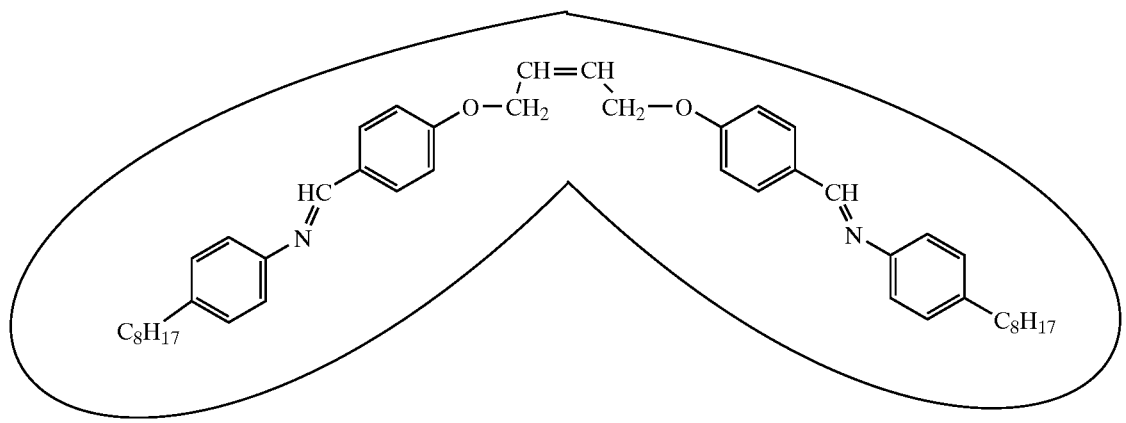

A liquid crystal display device as in Embodiment 1 was produced using the banana-shaped liquid crystal material represented by Formula 8, and the characteristics thereof were examined. As a result, it was possible to substantially increase the transmission thereof at a low voltage, whereby a liquid crystal display device having a high aperture ratio was obtained. Moreover, a high contrast image was obtained when a still image and a motion picture were displayed.

Moreover, a liquid crystal display device having similarly desirable characteristics was obtained when the ether compound as listed in Table 5 (e.g., ether compond where $R_3$ is $CH_3$ and $R_4$ is $CH_3$) was used instead of ethylene.

On the other hand, with the generally linear compound, it was not possible to obtain a liquid crystal display device having such desirable characteristics.

Embodiment 6

The banana-shaped liquid crystal material represented by Formula 9 was obtained by reacting the ketone compound as listed in Table 5 with a rodlike compound having a structure similar to that represented by Formula 1 under a suitable condition.

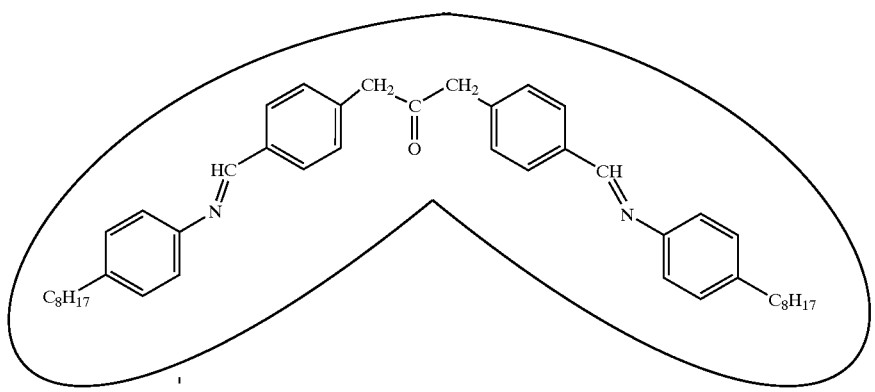

Formula 9

The liquid crystal material represented by Formula 9 had a permanent dipole moment greater than that of the liquid crystal material represented by Formula 8. A liquid crystal display device as in Embodiment 5 was produced using the liquid crystal material represented by Formula 9, and the characteristics thereof were examined. As a result, the response speed was higher than that of the liquid crystal display device according to Embodiment 5 (the liquid crystal display device using the liquid crystal material represented by Formula 8). Moreover, it was possible to substantially increase the transmission thereof at a low voltage. Thus, a liquid crystal display device having a high aperture ratio was obtained. Furthermore, a high contrast image was obtained when a still image and a motion picture were displayed.

As described above, according to the present invention, a transverse electric field type liquid crystal display device of a novel display mode having pixel size and driving voltage in a practical range, a high aperture ratio, a high contrast, a high response speed, and capability of displaying a high definition image is provided. Furthermore, a liquid crystal material which may provide such a liquid crystal display device is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal material, having a banana-like molecular shape including two rodlike portions derived from a rodlike compound, at least one of which exhibits liquid crystallinity, and a linking portion derived from a compound selected from an alkyl alcohol compound represented by the formula: HO—$(CH_2)_n$—OH, wherein n is an odd number, a cycloalkyl compound, a heterocyclic ring compound and a nonlinear compound selected from a substituted or non-substituted alkyl ether, a substituted or non-substituted alkyl ketone, and an ethylenically unsaturated hydrocarbon group.

2. A liquid crystal material according to claim 1, wherein the linking portion is derived from a compound having a dipole moment.

3. A liquid crystal material, having a conical molecular shape including at least three rodlike portions derived from a rodlike compound, at least one of which exhibits liquid crystallinity, and a linking portion derived from a compound selected from an alcohol compound, a ring compound and a nonlinear compound.

4. A liquid crystal material according to claim 3, wherein the linking portion is derived from a compound having a dipole moment.

* * * * *